United States Patent [19]

Rossmere et al.

[11] Patent Number: 5,508,940

[45] Date of Patent: Apr. 16, 1996

[54] RANDOM ACCESS AUDIO/VIDEO PROCESSOR WITH MULTIPLE OUTPUTS

[75] Inventors: David L. Rossmere; Robert S. Glenn, Jr., both of San Jose; William B. Brown, Los Gatos; John B. Carlucci; Robert W. Duffy, both of Milpitas, all of Calif.

[73] Assignee: Sony Corporation of Japan and Sony Electronics, Inc., Park Ridge, N.J.

[21] Appl. No.: 196,018

[22] Filed: Feb. 14, 1994

[51] Int. Cl.$^6$ ................................................. G06K 15/00
[52] U.S. Cl. .......................... 364/514 A; 395/154; 360/13
[58] Field of Search .................... 364/514; 395/152–155, 395/162; 348/1, 5, 7, 10, 559, 560, 725, 571, 722, 714, 439, 569, 441; 360/7, 32, 13–14.3, 39

[56] References Cited

U.S. PATENT DOCUMENTS

| | | | |
|---|---|---|---|
| 4,974,178 | 11/1990 | Izeki et al. | 364/523 |
| 5,241,428 | 8/1993 | Goldwasser et al. | 360/7 |
| 5,367,341 | 11/1994 | Schnorf | 360/14.3 |
| 5,371,551 | 12/1994 | Logan et al. | 348/571 |
| 5,373,493 | 12/1994 | Iizuka | 360/32 |
| 5,400,077 | 3/1995 | Cookson et al. | 348/441 |

*Primary Examiner*—James P. Trammell
*Attorney, Agent, or Firm*—Irell & Manella

[57] ABSTRACT

A random access audio/video processor having multiple outputs is disclosed. The random access audio/video processor includes a main control unit having an analog video back panel, an analog audio back panel, an analog input/output (I/O) board. An audio processing board, a video processing board, a video effects board, a synchronization board, and a system board (containing the main CPU). The video processing board includes a compressor for compressing input video signals, and a triple transfer buffer, for intermediate storage of digital video path. The video processing board further includes decompression circuits coupled to each of two triple transfer buffers for decompressing compressed stored video, and providing the decompressed video channels to an effects board for the addition of special effects. The audio processing board contains four digital signal processors for audio compression, decompression, and effects processor. It also contains triple transfer buffers for intermediate storage of digital audio data. The system board contains the main CPU, DMA controllers and SCSI interfaces required to perform high speed audio-video data transfers to/from disk. The triple transfer buffers of the present invention include a present buffer, a past buffer and a future buffer, the purpose of which is to ensure that there is sufficient video and audio material in the present buffers to minimize any discontinuities in either the audio or the video channel outputs. The invention provides an E to C mode to allow the user to view video which has been compressed and decompressed to verify that no unwanted system artifacts exist or are being created by the compression process. The viewing of the compressed and decompressed material is done in real-time while the material is being compressed and stored. Under software control, a user may bypass the compression circuit and capture uncompressed still frames directly in the triple transfer buffer, and store the uncompressed still frames, thereby permitting the independent display of still and motion video in each respective output channel.

84 Claims, 14 Drawing Sheets

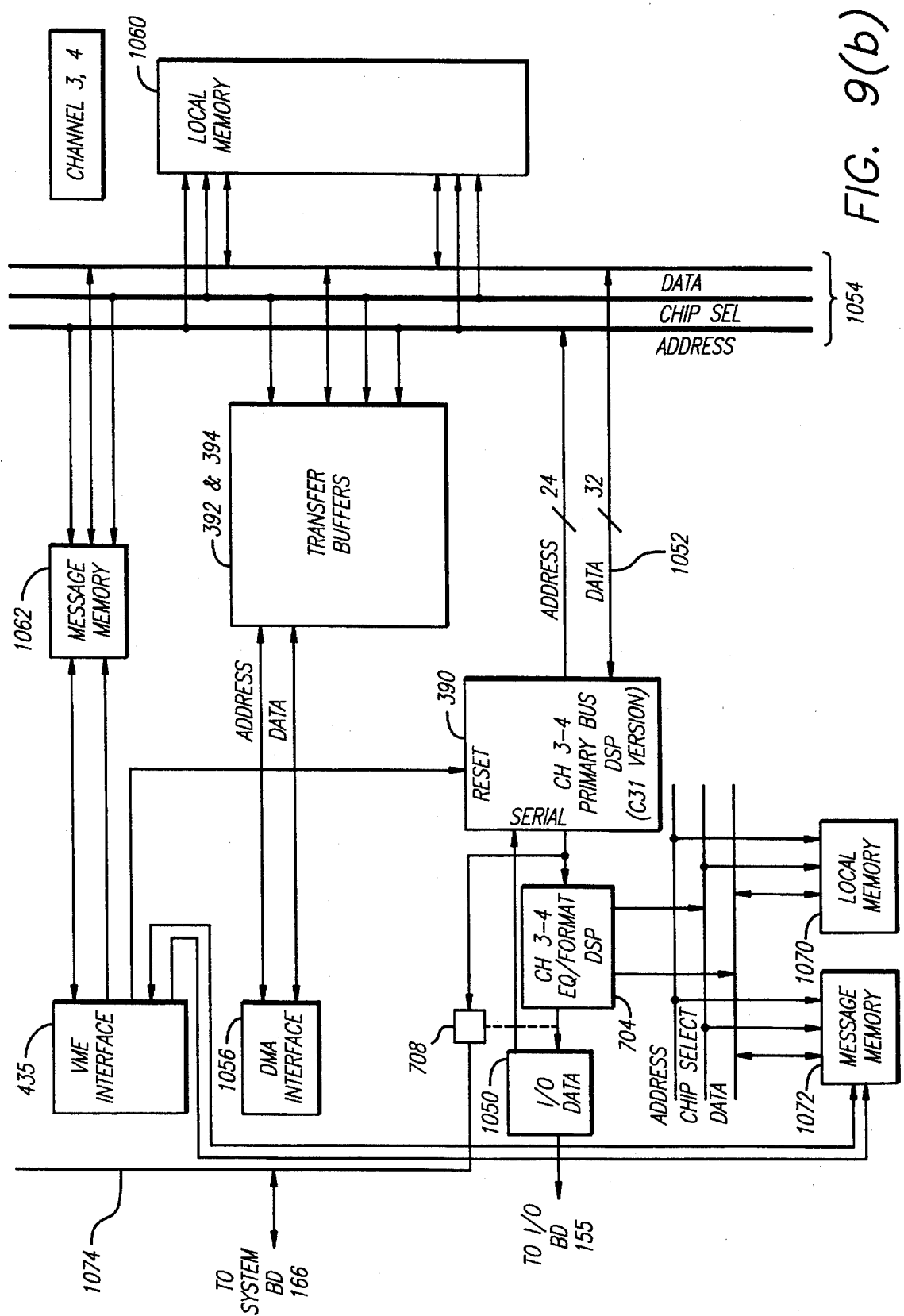

RANDOM ACCESS AUDIO/VIDEO PROCESSOR WITH MULTIPLE OUTPUTS

BACKGROUND OF THE INVENTION

1. Field of the Invention

The present invention relates to the field of audio/video processors, storage devices and servers, and more particularly, to random access audio/video systems.

2. Art Background

Video editing systems have evolved from providing simple editing cuts to the incorporation of full feature graphics, film-to-tape, and other processes to complete a video production. Non-linear random access video editing systems permit access to any video frame from any location on the storage media and rearrangement of the frame into a desired output. The coupling of computer technology with video tape editing systems, as well as multimedia hardware and software support, including, by way of example, CD ROM technology, magnetic storage media and graphic user interface technology, permits the editor to incorporate and integrate various production media resources such as special effects, music, graphics, and the like into a production. One of the requirements of any multimedia video/audio editing system is to provide the operator with the ability to manage large quantities of information in an understandable and efficient manner. The system must be flexible, and intuitive, to accommodate a variety of operator editing styles and personalities. Various video tape editing systems have been developed in the past, for example the Sony BVE 9000 manufactured by Sony Corporation of Tokyo, Japan, and those systems described, for example, in U.S. Pat. Nos. 5,262,865, 5,148,514 and U.S. Pat. No. 4,538,188.

As will be described, the present invention provides a multimedia random access audio/video editing system, heretofore unknown in the prior art, which allows users to configure the editing system to suit their needs. As an off-line machine, the present invention permits the storage of large amounts of source material and emulates many existing video tape recorders. For on-line service, the present invention provides high quality audio and video material, and includes a variety of on-line, real-time, audio and video effects. As will be described, the architecture of the present invention is modular, such that it may be upgraded to take advantage of improved storage and compression technology which may be developed in the future. Moreover, the present invention may be utilized in electronic newsroom settings for providing access to source material to multiple editing stations. The edited material may then be coupled directly to, for example, an electronic publishing system, a television transmitting system, or a cable head end.

SUMMARY OF THE INVENTION

A random access audio/video processor with multiple outputs is disclosed. In one embodiment of the present invention, dual source video tape recorders provide original source material and are coupled to the inputs of a main control unit. A video effects device is coupled to the video outputs of the main control unit. The outputs of the video effects device are run to a record video tape recorder (VTR), and to a video monitor. An audio effects device is coupled to the audio outputs of the main control unit. The outputs of the audio effects device are run to the record VTR, and to a pair of audio monitors. In the present embodiment, the video effects device comprises a Sony DFS 500 DME Switcher, and the audio effects device comprises a "Mark of the Unicorn" audio mixer. In the presently preferred embodiment, a personal computer is coupled to the main control unit. Magnetic (or optical) mass storage devices are coupled to the main control unit, and are used for storage of digitized audio and video material.

The main control unit of the present invention includes an analog video back panel and an analog audio back panel coupled, respectively, to an analog input/output (I/O) board. The analog I/O board is coupled to a video processing board and to an audio processing board. The video processing board includes a compressor for compressing input video signals and storing the compressed signals in a triple transfer buffer. In the present embodiment, two video triple transfer buffers are coupled to a bus which is further coupled to a direct memory access (DMA) device for accessing, storing and retrieving video data from the magnetic disk. The video processing board further includes decompression circuits coupled to each of the triple transfer buffers for decompressing compressed stored video and providing the decompressed video channels (Channel A and Channel B) to an effects board for the addition of special effects, as desired by the editor. The output of the effects board is coupled to the analog I/O board and through the analog video back panel to the record VTR. Similarly, two channels of audio may be input to the control unit of the present invention for digitization and storage on the magnetic disks. In the presently preferred embodiment, two triple transfer buffers are provided for the respective audio channel inputs. On the output side, a total of four triple transfer buffers are provided, one for each of the four audio outputs of the present invention.

The video processing and audio processing boards are coupled to a system board including DMA devices for accessing the video and audio data stored on the magnetic disks, and a central processing unit (CPU) for coordinating the fetching and storing of video and audio data over the various busses, completion of file formatting operations, and the maintenance of various logs for identifying video and audio digitized data stored on the video and audio magnetic disks.

The triple transfer buffers of the present invention include a present buffer, a past buffer, and a future buffer. The purpose of the triple transfer buffers of the present invention is to ensure that there is sufficient video and audio material in the present buffers to play (at video and at audio rates), such that the user will be not perceive any discontinuities in either the audio or the video channel outputs. In operation, as the user plays through audio or video material in the forward direction, the end of the present buffer is reached, the future buffer becomes the new present buffer, the past buffer becomes the new future buffer, and the present buffer becomes the new past buffer. If the user desires to view video frames in a reverse direction, the opposite progression will occur. Thus, as a user moves in a forward or backward direction from the current present position, additional video and/or audio material is loaded into a currently unused buffer to avoid any delays in the user's perception of the displayed or sampled material. The use of three buffers with hysteresis prevents data access delays when the user is rocking forward and reverse across a buffer boundary.

An additional aspect of the present invention is that a user may view video which has been compressed and decompressed to verify that no unwanted system artifacts exist or are being created by the compression process. The viewing of the compressed and decompressed material is done in real-time while the material is actually being compressed by the compressor circuit of the video processing board. The architecture of the present invention permits a user to monitor the effect of the compression in real-time during the storage process of the video signal.

An additional feature of the present invention is its ability to play back two separate independent outputs from a common pool of recorded source material. When playing back two independent outputs, only half of the total disk bandwidth is used for each channel. Alternatively, the present invention permits maximum video quality by utilizing the entire bandwidth of the video disk for the display of a single output channel.

A further aspect of the present invention is that, under software control, a user may bypass the compression circuit and capture uncompressed still frames directly in the triple transfer buffer, and store the uncompressed stills on the video disk. Independent transfer buffers and control logic permit the display of both still and motion video on each respective output channel wherein the playback speed and timing of each channel may be independently adjusted.

Another feature of the system is the implementation of the media pipeline which provides the ability to store and retrieve high quality video, and allows video to be looped from the decompressor back to the compressor and then stored on the video disk. Through the use of the loop back circuit of the present invention, the editor is provided with a real-time effects preview capability. The present invention allows the editor to quickly recompress the video such that, for example, a frame stored at 100 kilobytes, followed by an effect using two frames stored at 50 kilobytes, and a subsequent frame of 100 kilobytes may be provided. To minimize the perceived degradation of video signal in the final effect output, the present invention can create the effect in software using 100 kilobyte frames, thereby maintaining the quality of the effect to match that of the video quality of the standard frames before and after the effect in the sequence of video frames. This feature allows both real-time effects at a reduced quality, or real-time effect previews. The preview may then be followed by a software assisted full quality effect.

BRIEF DESCRIPTION OF THE DRAWINGS

FIGS. 9a and 9b are block diagrams illustrating the audio processor circuitry of the present invention.

DETAILED DESCRIPTION OF THE INVENTION

The following detailed description will be divided into several sections. The first of these will describe a general system configuration of one embodiment of the present invention for audio/video editing of source material of video productions and other multimedia presentations. Subsequent sections will deal with various aspects of the present invention including video processing, audio processing, and special effects generation.

This application relates to the following copending patent applications, and hereby incorporates the disclosures of these applications by reference: U.S. patent application, Ser. No. 08/021,872, filed Feb. 24, 1993, entitled Graphical User Interface Incorporating A Horizontal Panning Workspace; U.S patent application, Ser. No. 08/047,828, filed Apr. 15, 1993, entitled A Re-Edit Function Allowing Bi-Directional Rippling; U.S. patent application, Ser. No. 08/047,825, filed Apr. 15, 1993, entitled Time Based Visual Display of Multiple-Track Interrelationships and Available Material During Re-Edit Functions U.S. Pat. No. 5,339,393; U.S. patent application, Ser. No. 08/024,271, filed Feb. 26, 1993, entitled A Card File Graphical User Interface With Visual-Representation of Video Data; U.S. patent application, Ser. No. 08/196,050, filed Feb. 24, 1994, entitled One-Pass Adaptive Bit Rate Control Method, invented by Michael Alan Kutner.

In addition, in the following description, numerous specific details are set forth, such as functional blocks representing certain data processing devices, component configurations, signals, data and control flow paths, and the like, to provide a thorough understanding of the present invention. However, it will be apparent to one skilled in the art that the present invention may be practiced without these specific details. In many instances, well known circuits and structures are not described in detail in order not to obscure the present invention unnecessarily.

General System and Configuration

Figure 1:
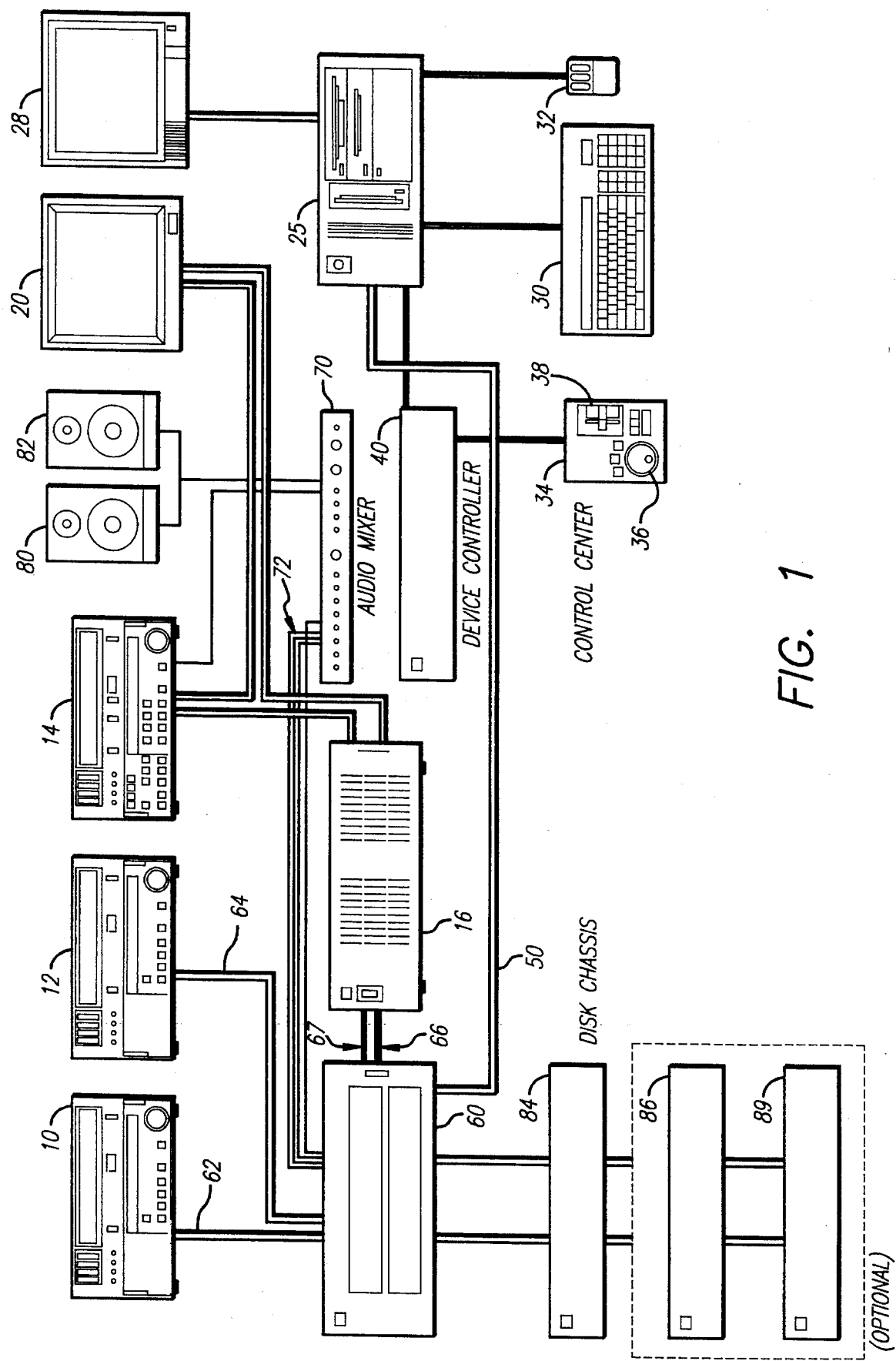
FIG. 1 illustrates a block diagram of a system configuration for one embodiment of the present invention.

Referring now to FIG. 1, the present invention is illustrated in one possible configuration of interconnected elements. As described, the present invention may be considered as an audio/video processor, where audio and video source material are processed and stored on either a hard disk, CD ROM, magnetic media or other combination of storage media. The present invention permits the audio and video material to be accessed, on a frame by frame basis, quickly from any location on the storage media, and rearranged into a desired output for video/audio editing. The present invention allows the user to edit material and to view the final output in real-time, without having to linearly record source clips on a piece by piece basis to a separate machine for later viewing. In addition, the present invention does not require that the original source material be modified, edited or otherwise rearranged, and thereby maintains the source material in its original form. Moreover, the present invention allows effects and timing relationships to be modified between multiple streams of material, in real time, and provides high quality reproduction during single stream playback. As will be described, the output of the present invention may be used as the final combined material, or as a real time preview for editing.

As shown in FIG. 1, dual source video tape recorders (VTRs) 10 and 12 provide original source material to the system illustrated in the figure. A record VTR 14 records the edited audio/video material for later viewing. As shown in FIG. 1, the record VTR 14 is coupled to an effects device 16, which in the presently preferred embodiment, comprises a Sony DFS 500 DME Switcher. As shown, the record VTR 14 is further coupled to a monitor 20 for displaying video material recorded and stored on the VTR 14. The system of the present invention as illustrated in FIG. 1 further includes a computer 25, which, in the presently preferred embodiment, comprises a personal computer ("PC") utilizing a 486 (66 megahertz) Intel® microprocessor. A video monitor 28 is coupled to the computer 25 for the display of a graphic user interface such as that disclosed in U.S. patent application Ser. No. 08/021,872, filed Feb. 24, 1993 and entitled "Graphical User Interface Incorporating A Horizontal Panning Workspace", as well as Ser. No. 08/047,828, filed Apr. 15, 1993 and entitled "A Re-Edit Function Allowing By-Directional Rippling", and Ser. No. 08/047,825, filed Apr. 15, 1993 and entitled "Time Based Visual Display of Multiple Track Interrelationships And Available Material During Re-Edit Functions" U.S. Pat. No. 5,339,393, and Ser. No. 08/024,271, filed Feb. 26, 1993 and entitled "A Card File Graphical User Interface With Visual Representation Of Video Data".

As illustrated in FIG. 1, a keyboard 30 is coupled to the computer 25 for providing input commands to the computer 25, as is well known. A cursor control device ("mouse") 32 is also coupled to the computer 25, for controlling the position of a cursor on the display 28. As shown, a control center 34 including a shuttle knob 36, fader bar 38, and other various controls is coupled to a device controller 40. The device controller 40 provides control signals to other video tape recorders, DME and mixing devices and the like, and is further coupled to the computer 25 as shown. The computer 25 is coupled over a "SCSI" bus 50 to a main control unit 60. The main control unit 60 receives data and commands over the bus 50 from the computer 25 in the form of play lists and/or direct commands. Moreover, the main control unit 60, as will be described in more detail in this Specification, is coupled to VTR 10 over video line 62, VTR 12 over video line 64, and the effects unit 16 over video lines 66 and 67. The main unit 60 is further coupled to an audio mixer 70 over four audio lines 72. The audio mixer 70 drives speakers 80 and 82 to permit the editor to listen to audio edits completed using the system illustrated in FIG. 1, The control unit 60 is further coupled to a magnetic (or optical) mass storage device 84, and optional mass storage devices 86 and 89, as shown.

It will be appreciated that the configuration of the present invention as illustrated in FIG. 1 is representative of one of many possible configurations which may be utilized in accordance with the teachings herein. In particular, the components illustrated in FIG. 1 may be rearranged, and, the main control unit 60 may be used in conjunction with other known components not illustrated.

The reader is referred to the marketing brochure information and manual for the Sony DES 500 Destiny editing workstation, for a discussion as to the use and operation of the effects unit 16 in conjunction with the computer 25, control center 34, and other illustrated components. This Specification will be directed to the operation of the main control unit 60 in conjunction with the components shown in FIG. 1. The use of computer 25 in conjunction with the effects unit 16 and a source VTR, such as for example VTR 10 in conjunction with record VTR 14, permits off-line and on-line linear editing, albeit without the ability to achieve random access audio/video editing and previewing provided by the main control unit 60. As such, it will be appreciated that various combinations of the components illustrated in FIG. 1 provide flexibility for a user to design an editing system for any particular application and budget.

Media Pipeline

Figure 2:
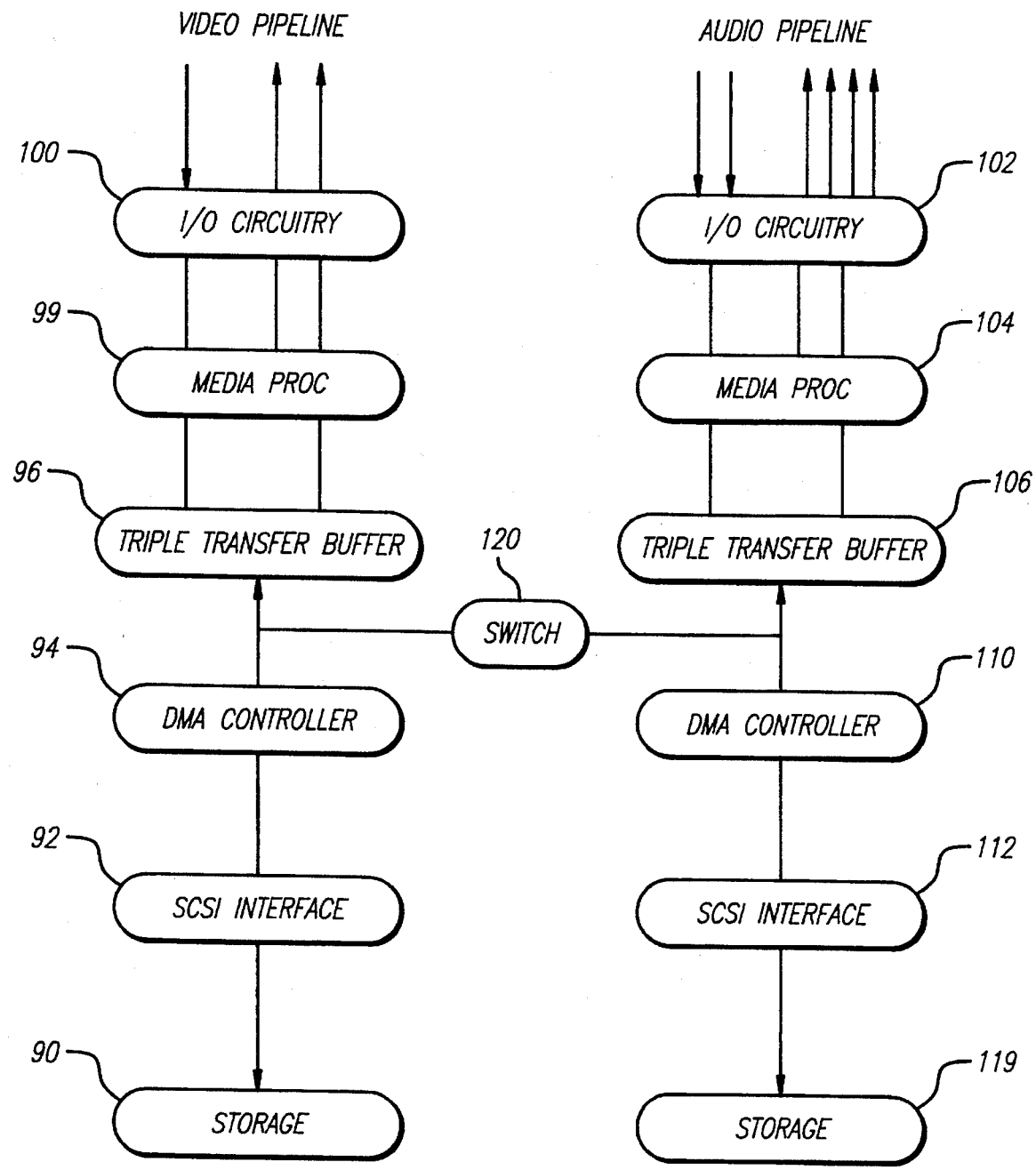
FIG. 2 illustrates a flow diagram of the media pipelines comprising the present invention.

Referring now to FIG. 2, a general overview of the media pipeline of the present invention will be described to provide additional background prior to a detailed description of the structure and operation of the main control unit 60. The system of the present invention is based upon a media pipeline which comprises a storage device 90, such as for example, the magnetic disk 84 illustrated in FIG. 1. A "SCSI" interface 92 couples the control unit 60 to the storage device 90. A direct memory access ("DMA") controller 94 is coupled to the SCSI interface 92 and to a triple transfer buffer 96. A media processing functional block 99 is coupled to the triple transfer buffer 96, as well as input/output (I/O) circuitry 100. The I/O circuitry 100 receives and transmits video information from an external device. Similarly, as illustrated in FIG. 2, an external device is coupled to an audio I/O circuitry 102 for receiving audio signals. A media processing block 104 is coupled to the I/O circuitry 102 and to an audio triple transfer buffer 106 as shown. An audio DMA controller 110 is coupled to a SCSI interface 112 for controlling the storage and retrieval of audio data in a storage device 119.

As is shown in FIG. 2, a switch 120 controls the transfer of video and audio data in the pipelines, and permits the sharing of storage devices, buffers and the like between video and audio data, as will be described more fully herein. The overall purpose of the media pipelines is to move video and audio data quickly from one end of the pipeline to the other. In the presently preferred embodiment, the pipeline may move data at approximately 20 Mega Bytes per second. The present invention stores compressed video information and uncompressed audio and requires, in the current embodiment, only 96 kilobytes per second throughput for each audio channel. Accordingly, the present invention is capable of handling multiple streams of audio and video data in real-time. As will be described, the structure of the present invention permits compressed video resampling to allow higher bandwidth throughput, and the simultaneous playback of multiple streams of material without exceeding the bandwidth limits of the media channel. The present implementation supports two output video channels and four output audio channels simultaneously. However, the media pipelines of the present invention are not limited to only two channels of video and four channels of audio, and alternate implementations of the present invention may be provided to enhance the number of video and audio channels available. Moreover, alpha numeric time code information may optionally be overlaid directly into either or both of the video outputs.

Main Control Unit

Figure 3A:
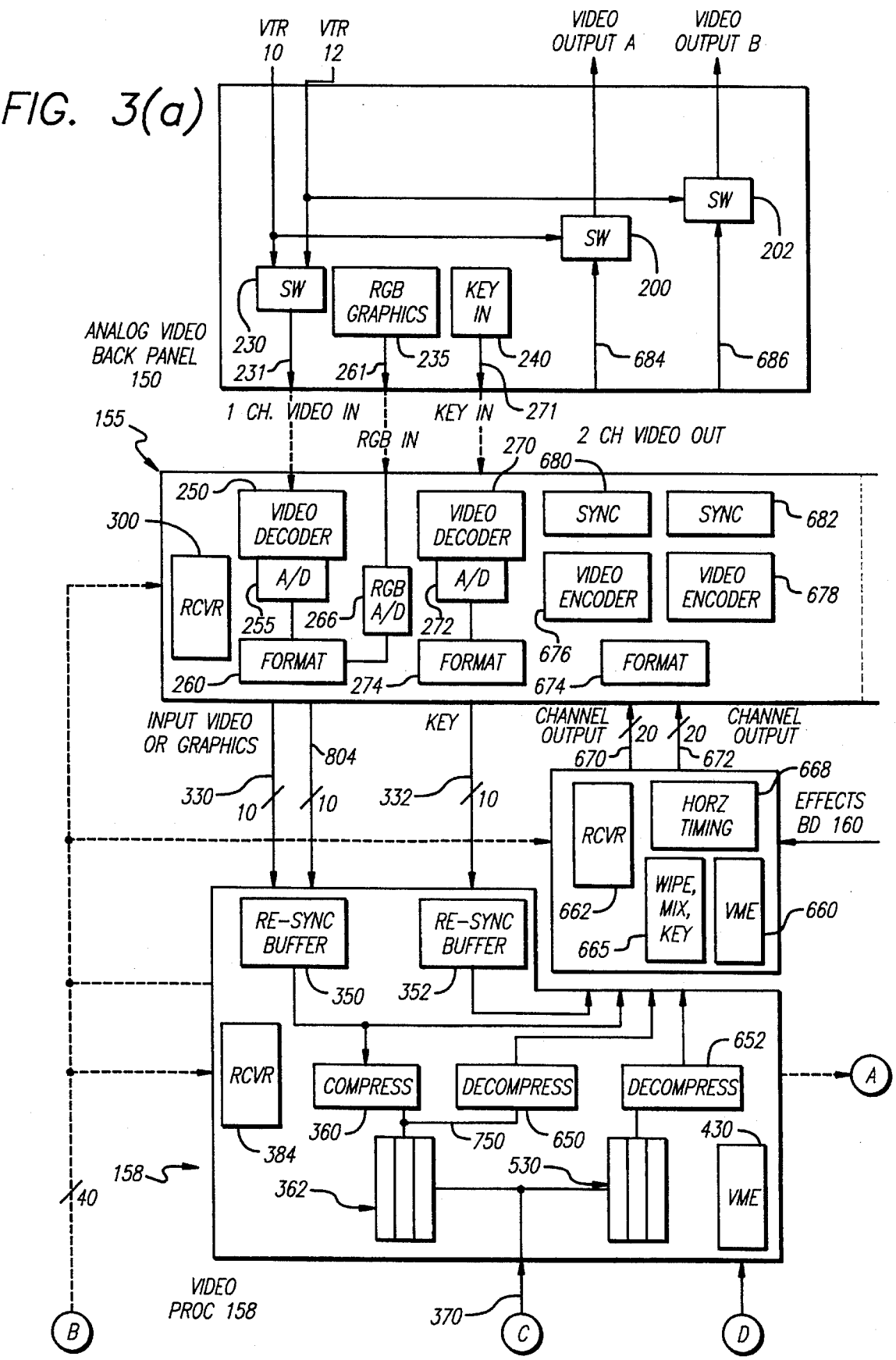
FIGS. 3a, 3b, 3c and 3d, illustrate a block diagram of the circuit components comprising the present invention.
Figure 3B:
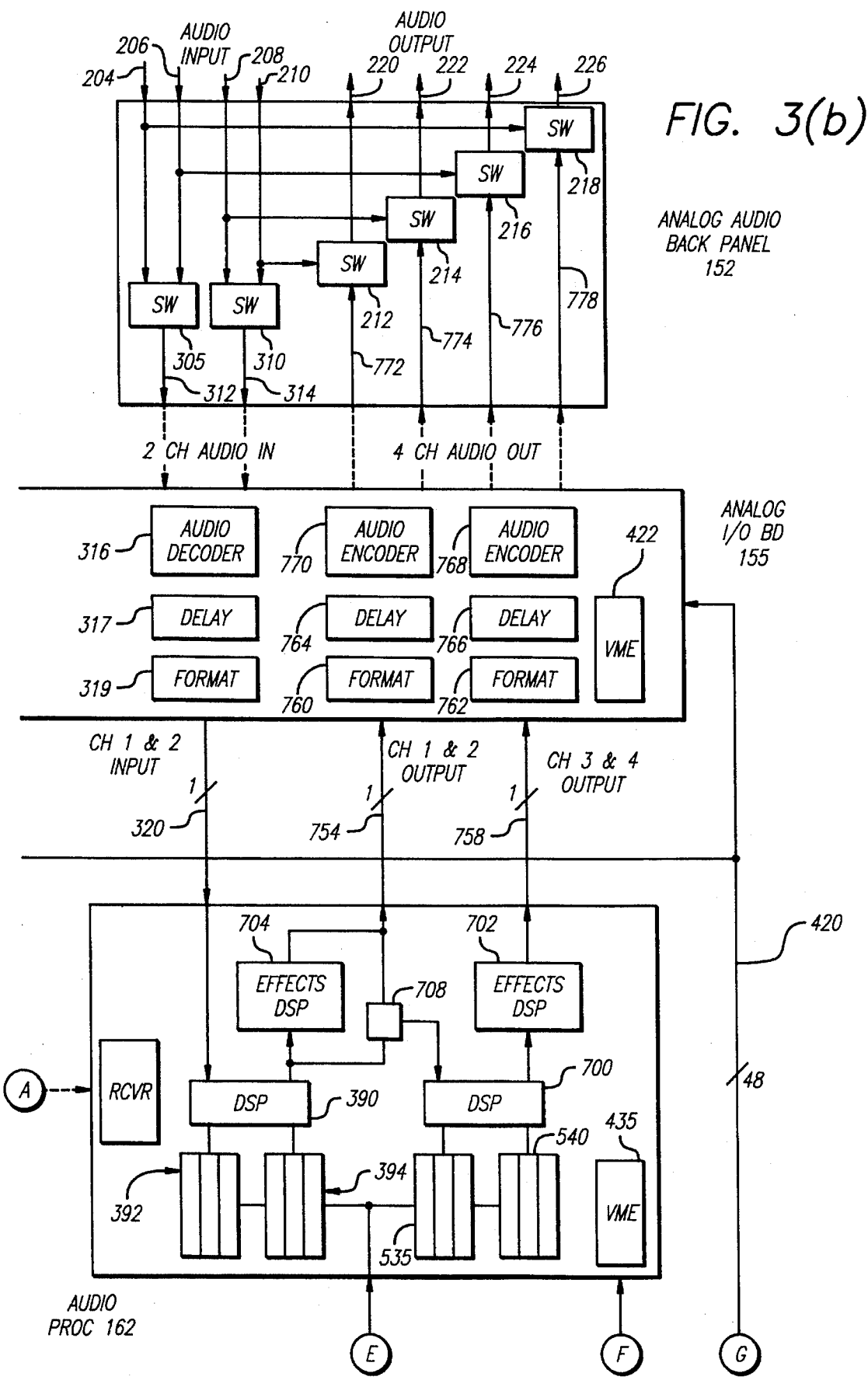

Referring now to FIG. 3a through 3d, the primary components of the main control unit 60 are illustrated in block diagram form. The main control unit 60 includes an analog video back panel 150 and an analog audio back panel 152. In addition, an analog I/O board 155 is provided to couple video data to and from a video processing board 158, and an effects board 160. Although the present Specification reference is made to analog audio and video inputs/outputs through the panels 150 and 152, respectively, and the analog I/O board 155, it will be appreciated that digital audio and video may also be input and/or output to the main control unit 60. Audio data is provided to an audio processing board 162 as shown in FIG. 3b. Video and audio DMA control signals are provided, respectively, by a system board 166 which is in turn coupled to the video disks 380 (including for example disk 84 of FIG. 1) and audio disks 410 (such as for example disk 86, or alternatively, a portion of disk 84 in FIG. 1). A sync generation board 170 provides synchronization and control signals to the various boards illustrated in FIGS. 3a through 3d.

Referring to the analog video back panel 150 of FIGS. 3a and 3b, source VTRs 10 and 12 provide analog video signals to the board 150. As shown, the present invention provides the ability to bypass the control unit 60 by selectively routing signals from VTR 10 and VTR 12 directly through switches 200 and 202 to the video outputs A (67 in FIG. 1) and B (66 in FIG. 1), as shown. Accordingly, if a user desires not to utilize the capabilities of the control unit 60, the analog video back panel 150 acts as a bypass through the system. Similarly, the analog audio back panel 152 receives four audio input channels 204, 206, 208 and 210. Through the selective activation of four switches (212, 214, 215 and/or 218), four audio outputs may be directly routed and thereby bypass the control unit 60, namely, audio outputs 220, 222, 224 and/or 226.

As illustrated in FIG. 3a, a switch 230 in the analog video back panel 150 selects which video channel (for example a video channel from VTR 10 or VTR 12) to be coupled to the analog I/O board 155 over a line 231. In addition, as illustrated in FIG. 3a, an RGB graphics circuit 235 provides RGB-in signals for use in the generation of graphics. Moreover, a key-in signal circuit 240 is provided for luma key, as is known in the art. In operation, the RGB graphics signal 235 is passed through the analog I/O board 155 and coupled to the effects board 160 for use in effects such as wipe, mix and the like. As illustrated, the video channel coupled to the analog I/O board 155 from the analog video back panel 150 is provided to a video decoder 250 for decoding the video signal, and is in turn coupled to an analog to digital (A/D) converter 255 to convert the analog video signal to a digital video signal. The digital video signal is then coupled to a formatter 260 for providing the digital video signal in the correct format for use in the system of the present invention. Similarly, the RGB graphics signal 235 is coupled over a line 261 to art RGB-in port on the analog I/O board 155 and to an RGB analog to digital (A/D) converter 266 which converts the signal into a digital form. The RGB digital signal from the RGB A/D converter 266 is coupled to the formatter 260 for proper formatting into a digital format. Similarly, the key-in signal 240 is coupled to a video decoder 270 over line 271 and an A/D converter 272. The digitized key-in signal is then coupled to a formatter 274 to be placed in the proper format for the digital system of the present invention. Additionally, as illustrated in FIG. 3a, a receiver 300 is provided on the analog I/O board 155 for receiving synchronization and clock signals from the sync generator circuit 170.

Referring to FIG. 3b, the analog I/O board 155 receives two audio channels selected from the four input audio channels 204, 206, 208 and 210 using switches 305 and 310. The input audio channels 312 and 314 are coupled to an audio decoder 316, a delay circuit 317 to match the delay of the video (for synchronization purposes), and a format circuit 319 to provide the audio signals in the correct format. The output of the analog I/O board 155 comprises a 1-bit audio line 320 for the two digitized audio channels.

Referring again to FIG. 3a, the output of formatter 260 comprises a 20-bit parallel digital video signal coupled over a video input bus 330. A digitized key signal output from the formatter 274 is coupled to a 10-bit wide key bus 332 as shown. The video signal over bus 330, and the key signal over bus 332 are coupled to the video processing board 158. A primary purpose of the video processing board 158 is to compress and decompress, as well as cache, the video signal input from bus 330, and video signals retrieved from the video disks 380. As shown, the video signal coupled over bus 330 is provided to a resync buffer 350. The resync buffer 350 provides resynchronization for the video signals input into the video processing board 158, such that the video signals are synchronized to the output side of the control unit 60. Additionally, as shown, the digitized and formatted key signal coupled over bus 332 to the video processing board 158 is also coupled to a resync buffer 352. The resynchronized video from resync buffer 350 is coupled to a compressor circuit 360, which in the presently preferred embodiment utilizes standard JPEG compression.

Figure 3C:
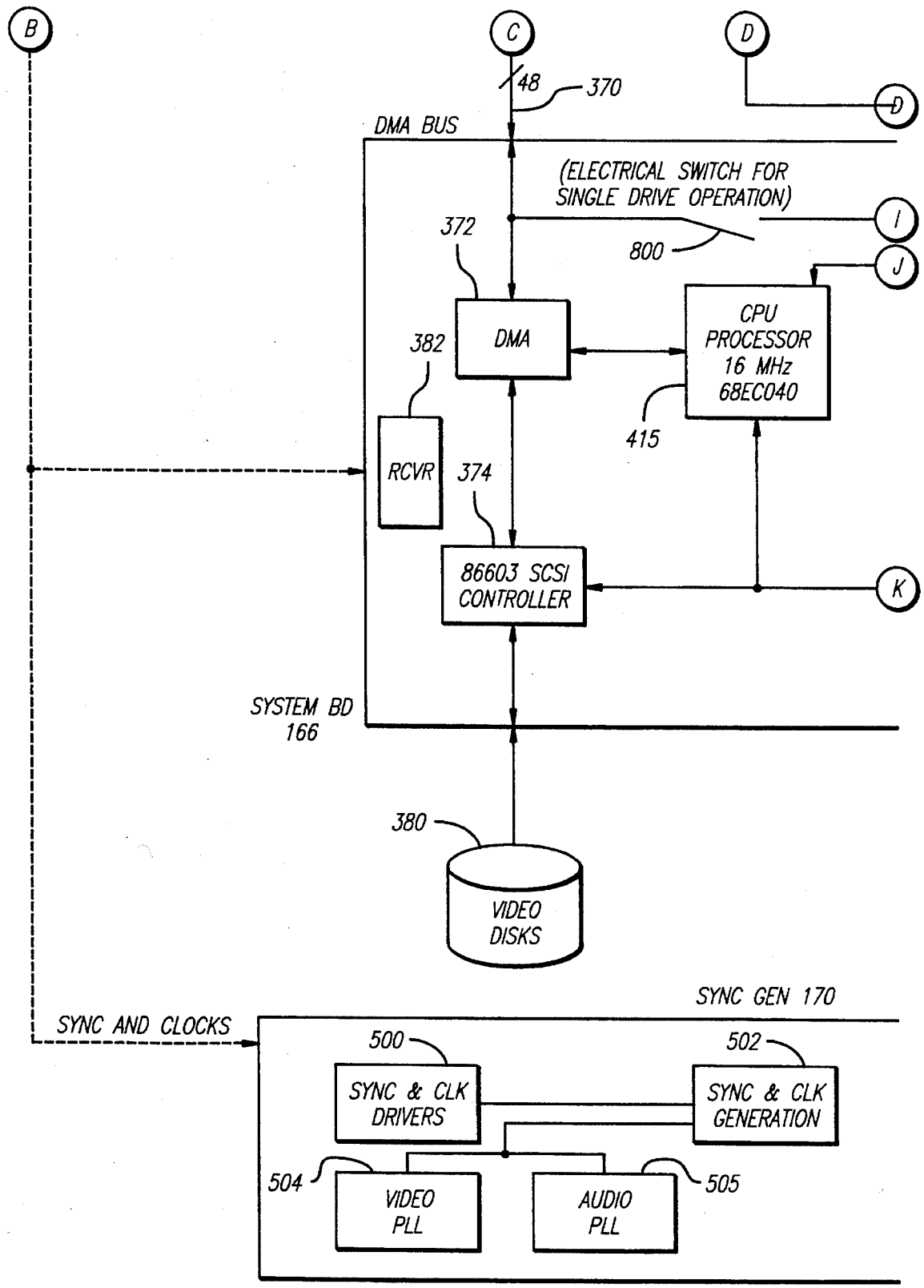

The compressed video is then coupled from the compressor 360 to a triple transfer buffer denoted generally by the numeral 362. The triple transfer buffer comprises dual port video RAM (VRAM). In the presently preferred embodiment, the triple transfer buffers comprise a buffer for the past, the present and the future, as will be described in more detail below. The compressed video data stored within the triple transfer buffer 362 may be accessed over a DMA bus 370 (comprising a 22-bit wide parallel bus), and are controlled through a DMA controller 372. A SCSI controller 374 controls the interface between the video disks 380 (for example disks 84, 86 and or 89 in FIG. 1) and the system board 166. As illustrated in FIG. 3c, system board 166 includes a synchronization receiver 382 for receiving synchronization signals from the synchronization generator 170, as does the video processor board 158 (receiver 384 in FIG. 3a), and the audio processor board 162.

Figure 3D:
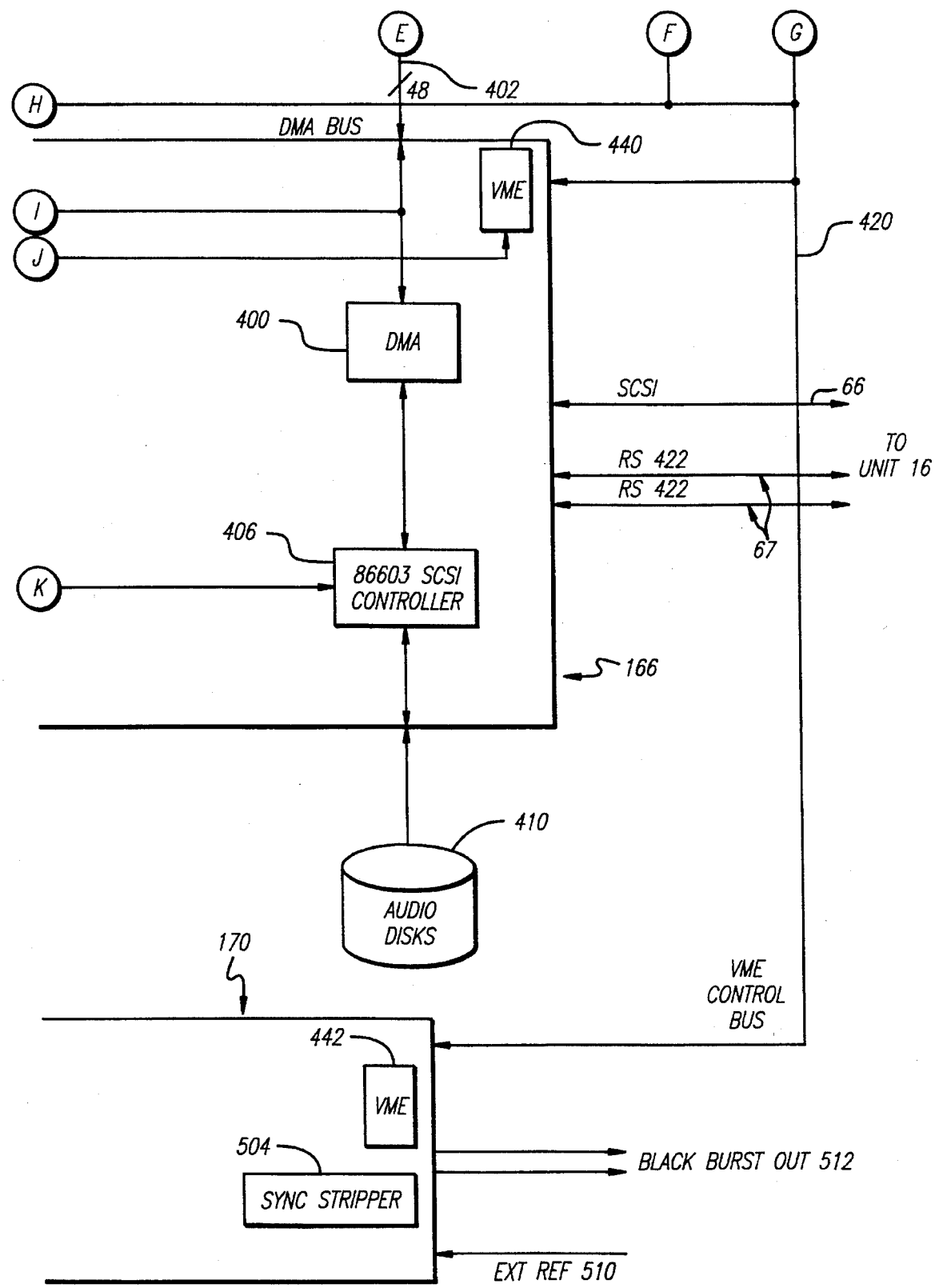

Referring once again to the analog I/O board 155 illustrated in FIG. 3b, digitized audio data from the formatter 319 coupled to the single bit line bus 320 is provided to the audio processor board 162. The digitized audio is coupled to a digital signal processor ("DSP") 390 on the audio processor board 162, and is coupled to a triple transfer buffer 392 and a triple transfer buffer 394, for each audio channel input into the analog I/O board 15,5, respectively. As illustrated in FIG. 3b, in its current embodiment, the present invention does not compress audio signals, but rather stores uncompressed digital audio in the transfer buffers 392 and 394 and audio disks 410. The digital audio is accessed by a DMA controller 400 over a DMA bus (in the present embodiment, a 22-bit wide bus) 402 as illustrated in FIGS. 3b and 3d. In a similar fashion as the previously described video portion of the present invention's system board 166, a SCSI controller 406 is coupled to the DMA 400, and provides control and interface signals to store and retrieve the digital audio signals from the audio disks 410. In practice, the video disks 380 and audio disks 410 may be implemented as a single magnetic disk (for example, disk 84) or comprise separate disks.

As shown in FIG. 3c, a central processing unit (CPU) 415 is coupled to the DMA units 372 and 400, as well as the SCSI controllers 374 and 406, and provides control signals for the various DMA and SCSI devices, as well as general coordination for the entire system operation. In practice, system control commands are provided by the CPU 415 to the various components on the analog I/O board 155, video processing board 158, audio processing board 162, and sync generator board 170 over a VME control bus 420. It will be noted that each of the boards comprising the invention illustrated in FIGS. 3a through 3d includes a VME interface circuit for receiving the control signals and communicating with the CPU 415. For example, the analog I/O board 155 includes a VME interface circuit 422, the video processing board 158 includes a VME control circuit 430, the audio processing board 162 includes a VME interface circuit 435, and the system board 166 includes a VME interface circuit 440, as does the sync generator board 170 include a VME interface circuit 442.

In operation, the CPU 415 controls the coordination of the fetching and storing of video and audio data over the DMA busses 370 and 402, completes file formatting operations for both the video disks 380 and audio disks 410, maintains various logs for identifying what video and audio digitized data is stored on the video disks 380 and audio disks 410, and generally executes the software required to effectuate the present invention as described in this Specification. In addition, for simplicity and brevity, the CPU 415 is shown as a single block in FIG. 3. However, it will be appreciated by one skilled in the art, that additional components such as read-only memory, a microprocessor, random access memory, control signals, devices and the like are not shown in order not to obscure the present invention unnecessarily.

Continuing to refer to FIGS. 3c and 3d, the sync generator board 170 includes synchronization and clock drivers 500 which are coupled to a synchronization and clock generator circuit 502. A video phase lock loop 504, and an audio phase lock loop 505 are also coupled to the sync and clock generation circuit 502. As is well known, a sync stripper 504 is provided for stripping synchronization signals from an external reference 510. Additionally, circuitry is provided within the sync generator board 170 to provide a black burst out signal 512, as is known in the art. The sync generator board 170 is responsible for providing synchronization and clock signals to the system illustrated in FIGS. 3a through 3d.

Continuing to refer to FIGS. 3a through 3d, the output data path of the present invention will be described. Data is read from the video disks 380 and audio disks 410 in data "chunks". In practice, two video channels are read from the video disk 380 by the DMA 372 and are coupled to the DMA bus 370 during playback. As previously noted, video stored on the video disks 380 are in a JPEG compressed format. Each of the video channels are stored, respectively, in the triple transfer buffer 362, and a second triple transfer buffer 530. On the audio side, four audio channels are read by the DMA controller 400 from the audio disks 410. The audio channels are coupled over the DMA bus 402 to triple transfer buffers 392, 394, and transfer buffers 535 and 540, respectively. Each audio channel is stored in one of the four triple transfer buffers illustrated in FIG. 3b.

Figure 6:
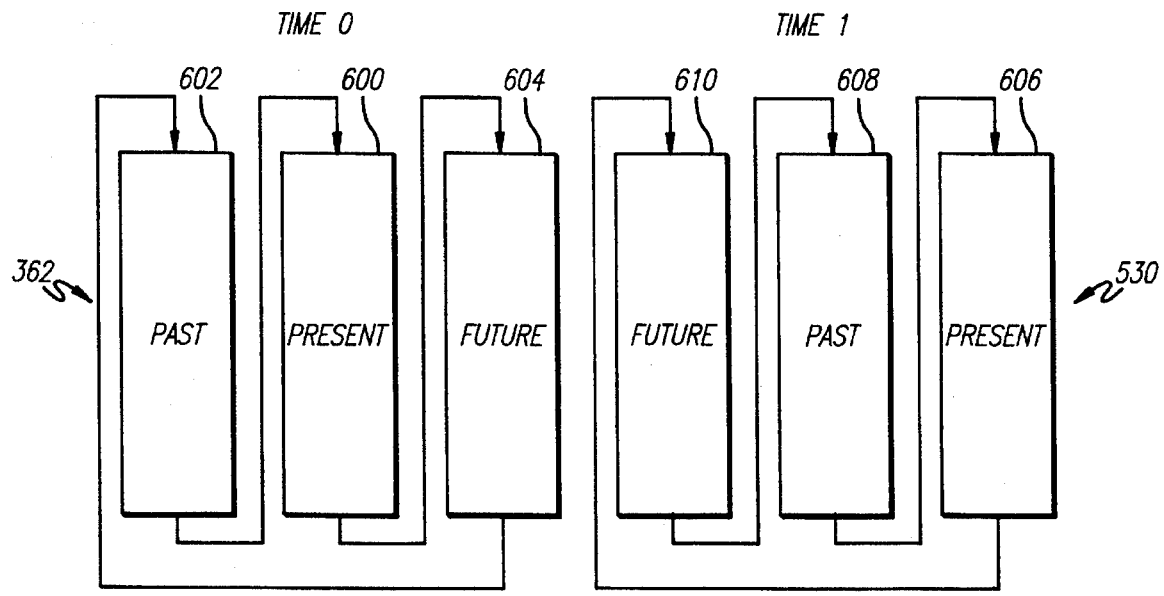
FIG. 6 diagramatically illustrates the present invention's use of triple transfer buffers for video and audio processing.

Referring to FIGS. 3a, 3b and 6, the triple transfer buffers comprise video RAM memories which are used to smooth out inconsistencies in the flow of data on both the audio and video processing sides of the control unit 60. For example, while filling a buffer for video output channel A, both video output channels A and B must be currently outputting video from the analog video back panel 150 to the system of FIG. 1. Therefore, a buffer is required to hold the data which is currently being played, while the video to be played next is loaded. Typically, this would require that the transfer buffers be divided into two parts. However, it is also contemplated that a user may decide at any moment to begin playing video in reverse from the present location or frame being viewed. Therefore, the present invention has divided the transfer buffers into three logical blocks as shown in FIGS. 3a, 3b and 6.

As illustrated in FIG. 6, each of the video transfer buffers (for example, buffer 362 and 530, as well as audio transfer buffers 392, 394, 535 and 540) include a present buffer 600, a past buffer 602, and a future buffer 604. Similarly, triple transfer buffer 530 includes a present buffer 606, a past buffer 608, and a future buffer 610, as shown in FIG. 6. The operation of the audio transfer buffers is similar to that of the video transfer buffers shown in FIG. 6, and will, therefore, not be described in further detail.

The purpose of the triple transfer buffers of the present invention is to ensure that there is always sufficient video (and audio) material in the present buffers to play (at video and audio rates), such that the user will not perceive any discontinuities in either the audio or the video channel outputs. Additionally, the buffers must be sufficiently large to provide enough time during the playback of material stored in the present buffers 600 and 606 to store and fill the past buffers 602 and 608. In operation, as the material is played in the forward direction, the data representing video (or audio) is played from the present buffer 600 at, for example, time 0. When buffer 600 is depleted (time 1), the future buffer 604 (at time 0) becomes the present buffer 606 (time 1). In operation, as the user selects audio or video material in the forward direction, the end of the present buffer is reached, the future buffer becomes the new present buffer, the past buffer becomes the new future buffer, and the present buffer becomes the new past buffer. If the user desires to view video frames in a reverse direction, the opposite progression will occur. Thus, as a user moves in a forward or backward direction from the current present position, additional video and/or audio material is loaded into a currently unused buffer to avoid any delays in the users perception of the displayed or sampled material. The use of three buffers with hysteresis prevents data access delays when the user is rocking forward and reverse across a buffer boundary. In the present embodiment, each of the buffers comprising the triple transfer buffers contain a maximum 1.3 megabytes of data, although the specific size of the buffers may be selected under software control depending on the application. Thus, the purpose of the triple transfer buffer is to ensure that sufficient video (and audio) material exists for viewing by a user if the user moves in a forward or backward direction from the current present position. In the presently preferred embodiment, to ensure a timely access to video or audio material stored in the transfer buffers, the input to the buffers is of a higher bandwidth than the play rate at the output end of the buffers.

Referring once again to FIG. 3a, the video processor board 158 provides two decompression circuits 650 and 652 coupled, respectively, to the transfer buffers 362 and 530, as shown. Thus, the compressed video for both channels (channels A and B) are each decompressed. The decompressed video is coupled to the effects board 160 for both channels A and B. As illustrated, the effects board 160 includes the output of the digitized key provided by the resync buffer 352, the output of the resync buffer 350, as well as the output from the decompression circuits 650 and 652, thereby providing four inputs into the effects board 160. In the presently preferred embodiment, the effects board 160 provides various affects, such as a wipe, mix, or key. Additionally, the four inputs illustrated in FIG. 3a to the effects board 160 may be selected under operator or software control. For example, one of the two channels provided from either the decompression circuits 650 or 652 may be selectively combined with the incoming video provided as an output from the resync buffer 150. Alternatively, the key output 352 may be used to provide effects on either, or both, of the outputs of the decompression circuits.

As shown, the effects board 160 includes a VME control bus interface circuit 660, and a receiver 662 for receiving the system resynchronization and clock signals from the sync generator board 170. The effects circuit 665 generates the wipe, mix, key and the like. A horizontal timing circuit 668 is also provided, as shown, for ensuring proper horizontal timing. The output of the effects board 160 comprises two channels, namely, channel 670 and channel 672, as shown in FIG. 3a. Both channel A (670) and channel B (672) are coupled to the analog I/O board 150 to a formatting circuit 674. The formatted video is coupled from the format circuit 674 to a video encoders 676 and 678 for each of the channels 670 and 672. A synchronizer circuit 680 is coupled to the video encoders 672 and 678, such that video provided by the video encoder 676 is coupled to a sync circuit 680, and video provided by the video encoder 678 is coupled to a sync circuit 682. The output of the sync circuit 680 and 682 comprise the two video out channels A and B of the present invention. These video outputs are coupled to a line 684 and 686, as shown in FIG. 3a. As illustrated, video outputs provided over lines 684 and 686 are coupled, respectively, to switches 200 and 202. As previously described with respect to the video back panel 150, the selection of switches 200 and/or 202 provide either outputs along lines 684 and 686, or direct output from the video inputs provided by VTR 10 and VTR 12.

Referring now to FIGS. 3b and 3d, audio data read from the audio disks 410 through the SCSI controller 406 are provided by the DMA 400 to the triple transfer buffers 392, 394, 535 and 540, respectively for each of the four audio channels. As illustrated, digital signal processors (DSPs) 390 and 700 are coupled to the transfer buffers. The operation of the triple transfer buffers disposed within the audio processing board 162 is similar to the triple transfer buffers provided on the video processor board 158, and will not be described in further detail herein. Audio data provided by triple transfer buffer 392 is coupled to DSP 390, as is audio data provided by triple transfer buffers 394. DSP 700 receives audio data stored in triple transfer buffers 535 and 540. The present invention provides for certain audio effects generated by DSP 702 and 704. As shown, DSP 704 is coupled to DSP 390, and DSP 702 is coupled to DSP 700. The use of four DSP devices (in the presently preferred embodiment, part numbers TMS320C31) permits the separation of various effects on each of the four audio channels. Also, as shown in FIG. 3b, a switch 708 permits audio data to be coupled from the DSP 390 or DSP 704 to DSP 700 for maximum system flexibility.

It will be appreciated by one skilled in the art that, although the present invention does not currently implement compressed and decompressed audio data, it is contemplated that such compression and decompression, similar to that provided for video data, may be implemented for the audio portion of the present invention.

One aspect of the present invention which will be appreciated from the above discussion with reference to FIGS. 3a through 3d, is that a user may view video which has been compressed and decompressed on the monitor 20 (see FIG. 1) to verify that no unwanted system artifacts exist or are being created by the compression process. For example, under certain circumstances, it is known that compression algorithms may produce certain artifacts in the decompressed signal. The architecture of the present invention permits a user to monitor the effect of the compression in real-time, selectively store the video signal, and dynamically alter the compression ratio. For example as shown in FIG. 3a, compressed video provided by the compression circuit 360 is stored in the triple transfer buffer 362. As previously described, the compressed video data stored in transfer buffer 362 is coupled to the DMA bus 370, and ultimately stored in compressed form on the video disks 380. However, the reader will note that a line 750 couples the triple transfer buffer 362 to the decompression circuit 650. A user may, in real-time, compress video through the compression circuit 360 and store the compressed video in the triple transfer buffer 362, while simultaneously coupling the compressed video to the decompression circuit 650. Thus, while the video data is being stored in the triple transfer buffer 362, it may also be decompressed, passed through the effects board 160 and the analog I/O board 155 through the analog audio back panel 152 and viewed on the monitor 20 by the editor. The present invention permits the user to view the effect of the compression algorithm on the video signal in what is effectively real-time, on monitor 20.

Referring to FIG. 3b, the audio processor 162 provides a serial output of four audio channels over lines 754 (Channels 1 and 2) and 758 (Channels 3 and 4). The digital audio signals are coupled to a format circuit 760 and 762, respectively, as shown in the figure. Delay circuits 764 and 766 are coupled to the format circuits respectively, as are audio encoders 768 and 770, as shown. The analog audio signals are coupled from the audio encoder 770 and 768, respectively to four audio signal paths 772, 774, 776 and 778, as shown. Each of the audio signal paths illustrated are coupled to switches 212, 214, 215 and 218, respectively. As previously described, the selection of the switches 212, 214, 215 and 218 permits the user to select and/or mix the audio inputs with the signals provided along the audio paths 772, 774, 776 and/or 778, as required for any particular application of the present invention.

An additional feature of the present invention is the ability to record a single source version of video material on video disks 380 (disks 84, 86 and/or 89 in FIG. 1) and play back two independent outputs (outputs A and B) from the same pool of source material. The source material stored on the video disk 380 may be retrieved by the DMA 372, and stored in the past transfer buffers (see FIG. 6). Alternatively, the present invention permits maximum video quality by utilizing the entire bandwidth of the video disk 380 and DMA 372. Depending on the application in which the present invention is used, a user may obtain the full benefit of the entire bandwidth of the present invention, or view material stored on the video disk 380 in such a manner as to provide maximum flexibility for the editor. It will be further appreciated that it is not necessary for the effects board 160 to be utilized, but rather, that the video signals may be provided to, and passed through, the effects board, and that the video outputs A and B may be coupled to a device having enhanced effect capability, such as unit 16 of FIG. 1 for the addition of high quality special effects.

Referring once again to FIGS. 3c and 3d, an electrical switch 800 is shown coupled between the DMA busses 370 and 402. The selective activation of switch 800 permits the storage of video data on the audio disk 410. Switch 800 would be optimally used in a system employing a single drive (such as a single drive 84 of FIG. 1). Additionally, it will be appreciated that through the use of switch 800, the system of the present invention may utilize the audio disk 410 as a backup for the video disk 380, or alternatively, may backup audio stored on the audio disks 410 on the video disks 380.

Figure 4:
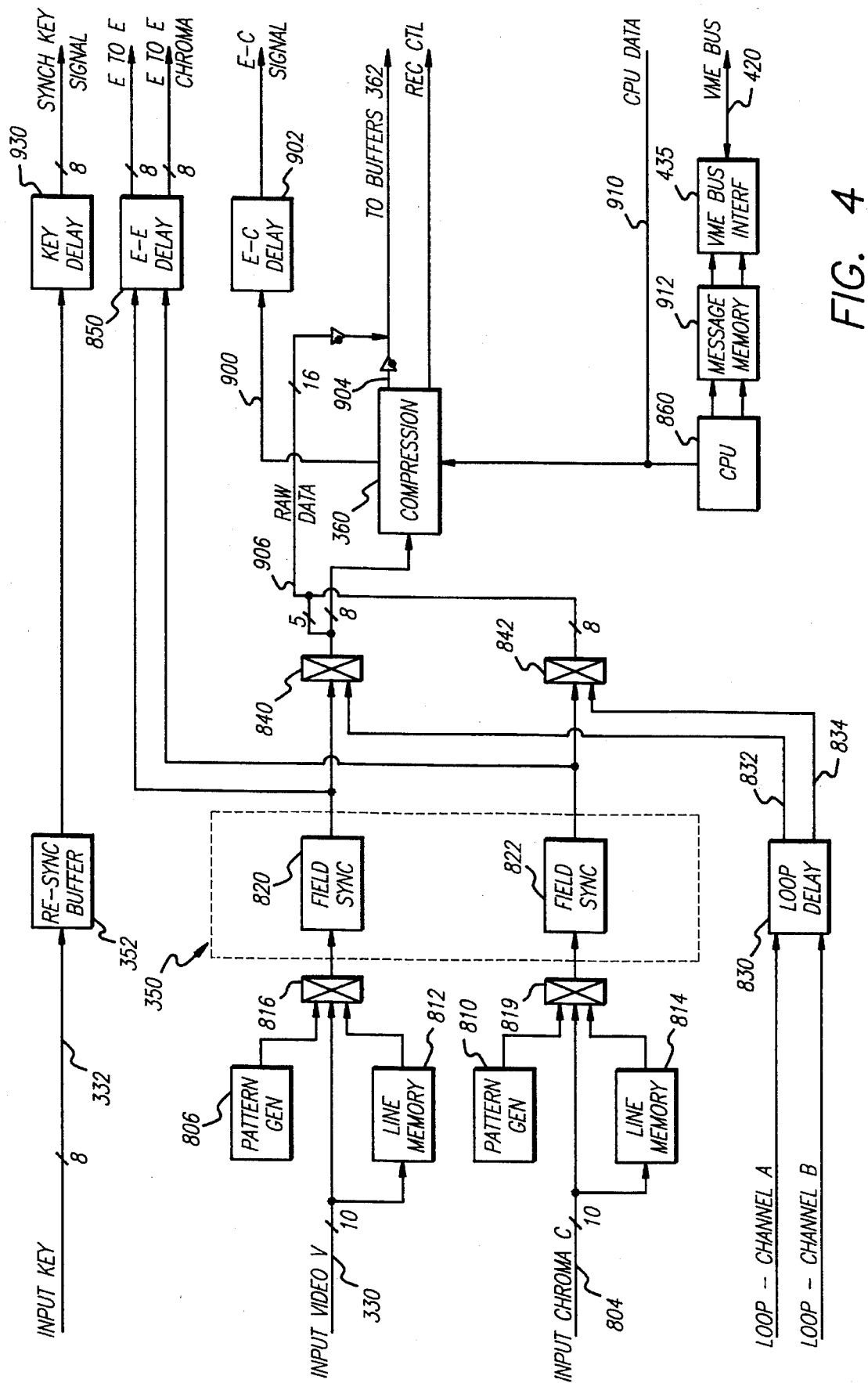
FIG. 4 is a circuit block diagram illustrating the compression circuitry for the video processing board of the present invention.

Referring now to FIG. 4, the video processor board 158 will be described in more detail. As illustrated, the input key signal over line 332 is coupled to the resync buffer 352. Additional inputs to the video processor board 158 include a video luminance input over line 330, and a video chroma input over line 804. The pattern generators 806 and 810 are used for diagnostic and debugging procedures. In addition, line memory circuit 812 and line memory circuit 814 are coupled, as shown, to a multiplexor 816 and 819, respectively. Line memories 812 and 814 are used to alleviate the effects on compression due to transitions caused by half line blanking of video standards. This is accomplished by effectively doubling up previous lines as needed to ensure proper black to white transitioning on the output. Field synchronization circuits 820 and 822 provide synchronization between input and output timing.

As illustrated in FIG. 4, a loop delay timing circuit 830 is provided for proper playback timing of video signals. The outputs 832 and 834 of the loop delay circuit 830 are coupled to multiplexors 840 and 842, respectively, as shown. Similarly, the output of the field synchronization circuit 820 is coupled to the multiplexor 840, and an electronic-to-electronic (E-E) delay circuit 850, as is the output of the field synchronization circuit 822.

As illustrated, multiplexors 840 and 842 selectively couple the input video channels to the compression circuit 360. In the presently preferred embodiment, compression circuit 360 comprises a variety of components to accomplish standard JPEG compression. Also as shown in FIG. 4, is a central processing unit 860 which controls the multiplexors 840 and 842 as well as other components on the video processor board 158 to accomplish the desired compression of the video signals. The output of the compression circuit 360 includes an E to C (Electronic to Compression) signal along line 900 which is coupled to an E to C delay circuit 902. The compression circuit 360 outputs the compressed video in digital form over line 904 to the triple transfer buffer 362.

As shown in FIG. 4, the present invention permits the user, under software control, to bypass the compression circuit 360 and to couple uncompressed raw video data from the resync buffer 350 directly to the triple transfer buffer 362 over a line 906 (not shown in FIG. 3a). Also, data required by CPU 860 is provided over a CPU data line 910. The CPU 860 has access to a message memory 912. A key delay circuit 930 provides any necessary synchronization delays to the key signal.

Continuing to refer to FIG. 4, a loop is defined from the input circuitry through the transfer buffers and back to the input circuitry of the present invention. Accordingly, video may be loaded from the disk into the transfer buffers for play at, for example 100 kilobytes per frame (a very high quality image). The frame of video may then be decompressed and looped back through the compressor at 50 kilobytes per frame (a 2 to 1 compression). The video image stored in a 2 to 1 compression format is then stored on the video disk 380.

Through the use of the loop circuit illustrated in FIG. 4, the present invention provides an important advantage over the prior art in that the present invention provides the editor with real-time preview capability. In prior art systems, effects disposed between, for example, frames of video, could be previewed by building the preview first to disk using software and then viewing the edited video with the effect on a monitor. The present invention allows the editor to quickly recompress the video in hardware, such that, for example, a frame stored at 100 kilobytes followed by an effect of two overlapping frames of 50 kilobytes each, and a subsequent frame at 100 kilobytes may be provided. In order to maximize the video pipeline bandwidth while playing or previewing a video effect, the present invention uses loopback recompression hardware to create two overlapping 50 kilobyte effect frames. Thus, real-time previews and effects may be provided by the present invention, while maintaining overall video image quality of 100 kilobytes. The output of one of the triple transfer buffers, for example triple transfer buffer 530, is coupled to the decompressor 652, which is then in turn coupled to the compressor 360 for recompression. The recompressed effect is then stored into one of the three transfer buffers comprising the triple transfer buffer 362.

Figure 10A:
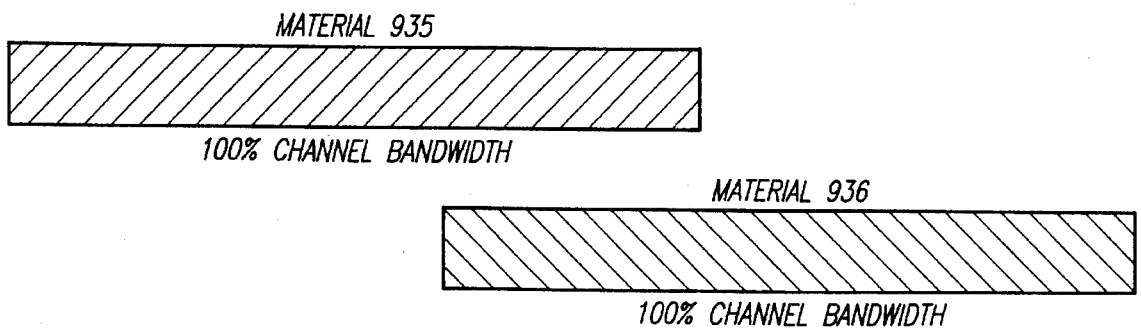
FIGS. 10a through 10d illustrate the present invention's use of the loop back circuit and recompression to optimize the video bandwidth for real-time previews and effects.
Figure 10B:
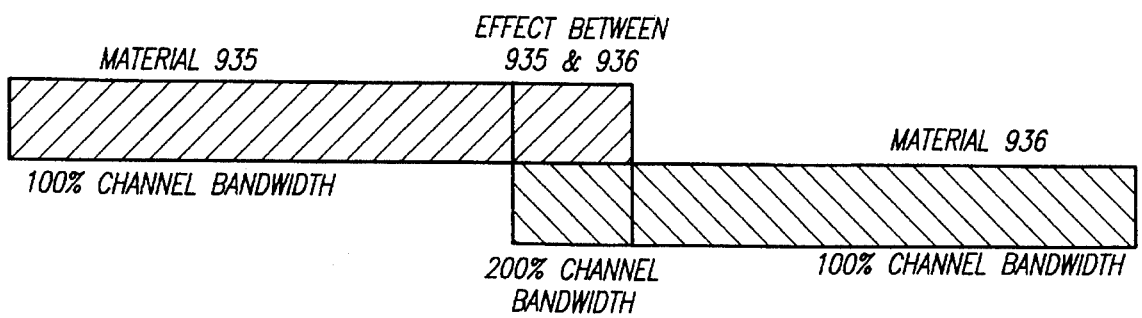
Figure 10C:
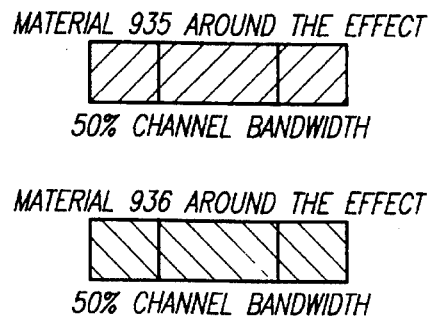
Figure 10D:
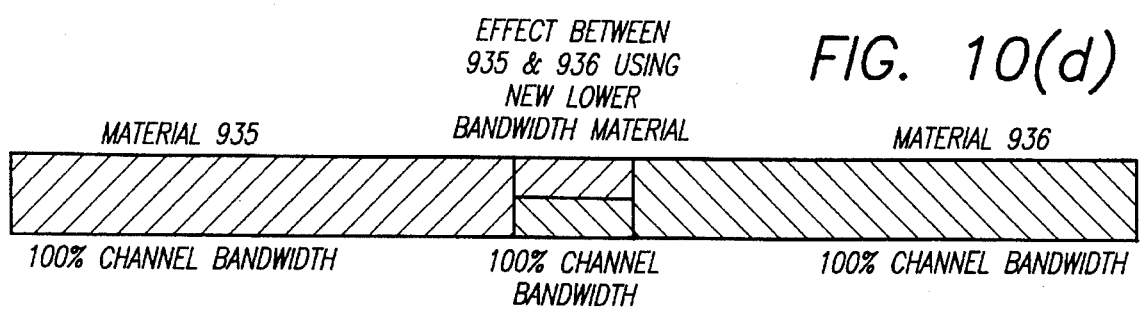

Referring now to FIGS. 10a through 10b, the present invention's use of the loop described with reference to FIGS. 3a through 3d and FIG. 4 will be described in more detail. As shown in FIG. 10a, prerecorded source material 935 is stored on the video disk 380 at 100% channel bandwidth. Similarly, prerecorded source material 936 is also stored in the video disk 380 at 100% channel bandwidth. In order to provide an effect between material 935 and 936, a 200% channel bandwidth would typically be required, as illustrated in FIG. 10b. However, utilizing the teachings of the present invention, the video frame regions surrounding the overlapping segments of material 935 and material 936 are compressed at one half of the channel bandwidth (see FIG. 10c). The lower bandwidth material is then utilized by the present invention during the effect for real-time preview or the final product. Thus, as shown in FIG. 10d, material 935 is edited with material 936, whereby the overlapping regions comprising the effect between material 935 and material 936 are generated using the new lower bandwidth material created by compressing the overlapping regions of material 935 and 936 at one half the channel bandwidth. A perceived degradation of the video signal between the prerecorded source material 935 and 936 and the effect between materials 935 and 936 may be reduced by ramping the compression ratio at the boundaries of the effect.

Figure 11:
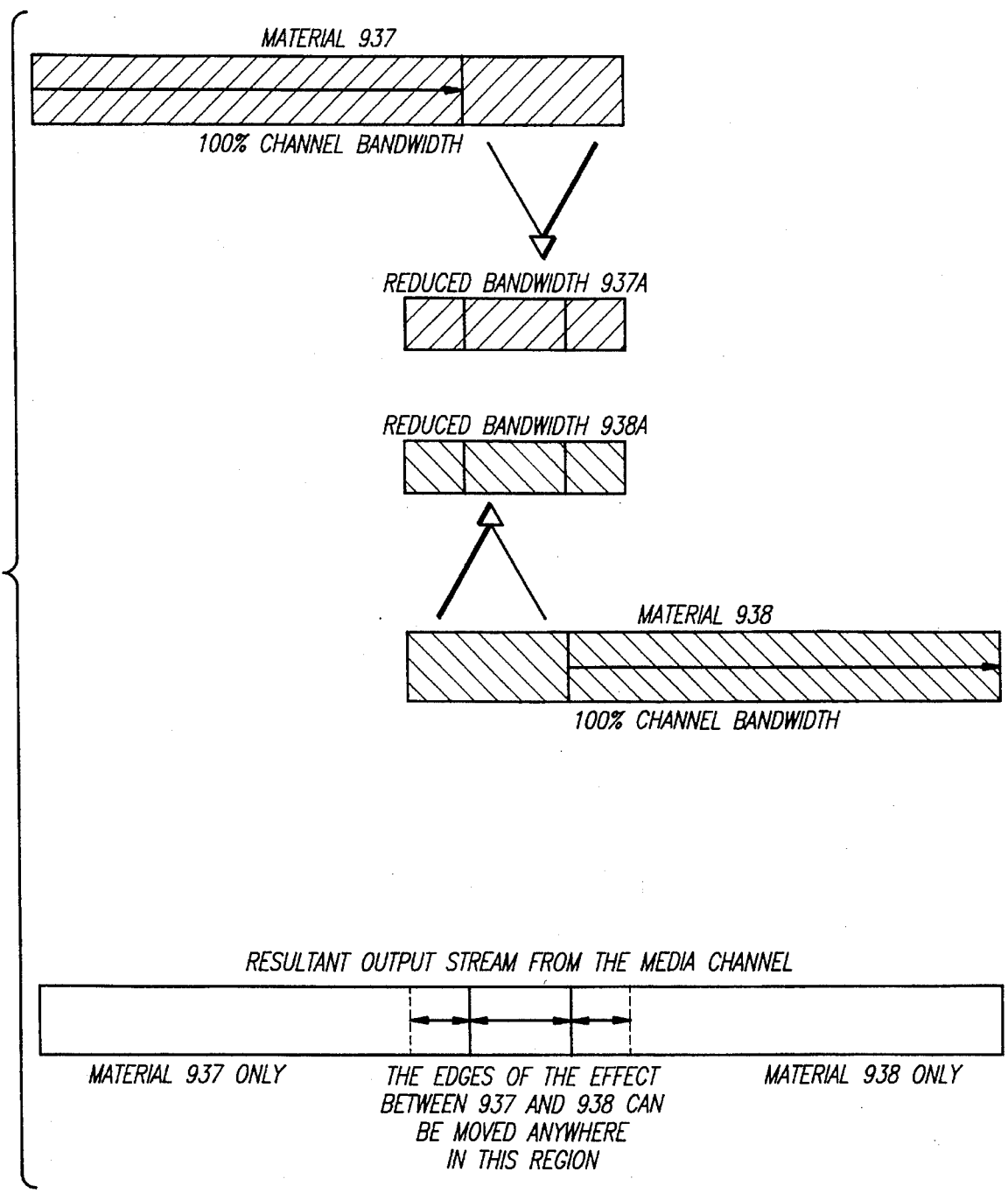
FIG. 11 illustrates the present invention's method for applying timing relationship adjustments during the effect preview.

Referring now to FIG. 11, the timing relationship between prerecorded source material 937 and 938 may be adjusted during real-time playback using the teachings of the present invention described herein. As illustrated in FIG. 11, material 937 is stored and compressed at 100% channel bandwidth. A portion of material 937 is recompressed to 50% channel bandwidth (referred to as material 937A), as is a portion of the material 938 (referred to as material 938A), as shown in FIG. 11.

As will be appreciated from discussion in this Specification, the real-time effect between material 937 and material 938 may be adjusted or otherwise modified each time the material is played back, thus allowing maximum flexibility for the editor. Accordingly, the present invention permits the user, under software control, to recompress recorded material at lower bandwidths allowing simultaneous playback of multiple streams of material without exceeding the bandwidth limits allocated to the media channel. The recorded material is stored at bandwidths approaching the limits allocated to the media channel to ensure the highest quality reproduction during single stream playback on the channel. The method and apparatus of the present invention as described herein, further allows multiple streams of the material to be simultaneously played on the same channel, in real-time, without exceeding the channel's bandwidth allocation. As described, the invention also allows effects and timing relationships to be modified between multiple streams of material without exceeding the bandwidth allocated to the media channel.

Figure 5:
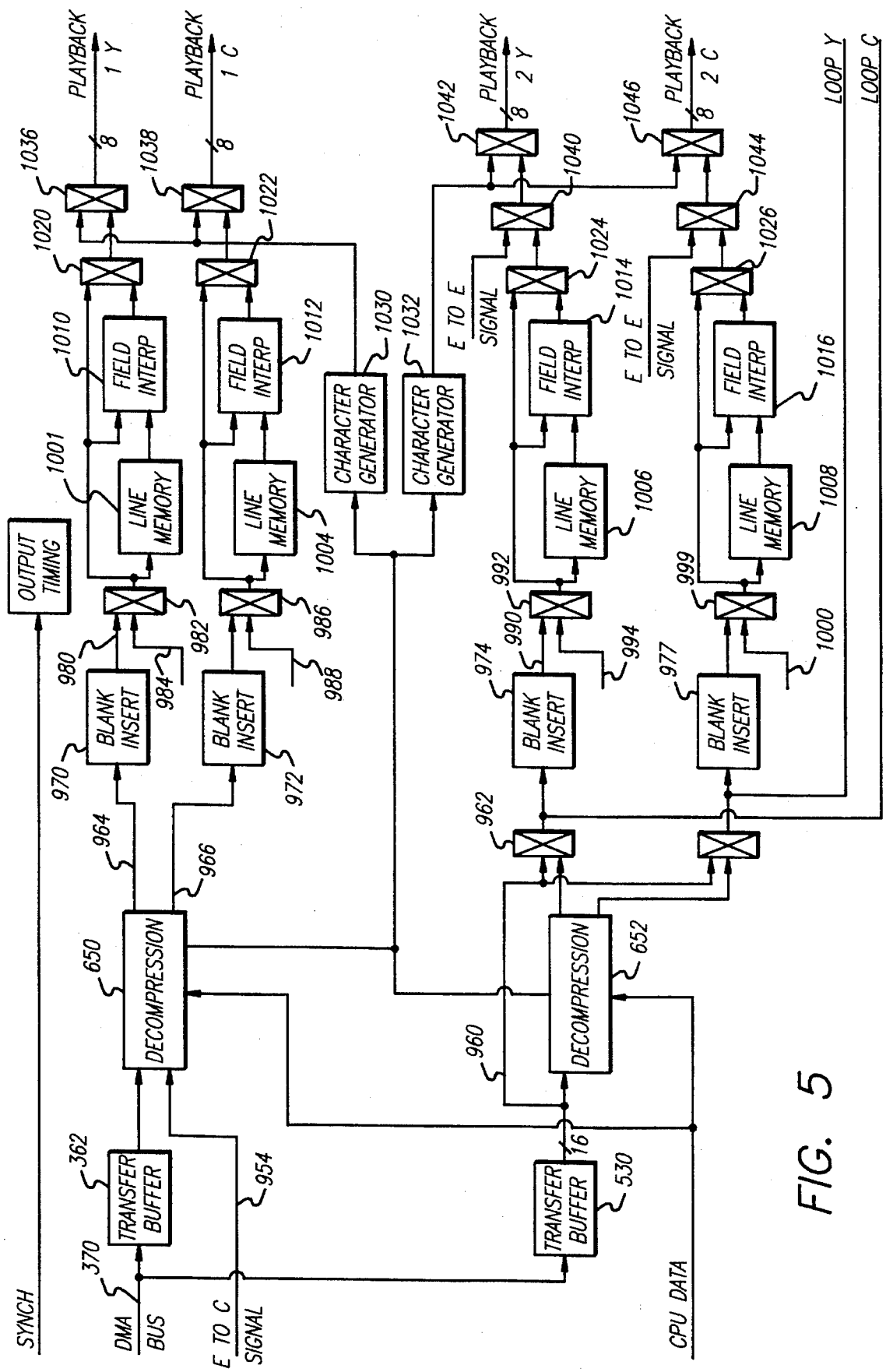
FIG. 5 is a circuit block diagram illustrating the decompression circuitry for the video processing board of the present invention.

Referring now to FIG. 5, The decompression process and apparatus of the video processing board 158 will be described in more detail. Video data stored on the video disk 380 is read by the DMA 372 and coupled over the DMA bus 370 to the transfer buffers 362 and transfer buffer 530. Additionally, the output from the E to C delay 902 (see FIG. 4) comprising the E to C data (where an "E to C" represents electronics to compression "transfer") is also provided over line 954, as shown in FIG. 5. Transfer buffer 362, the E to C signal line 954, and the output of transfer buffer 530 are coupled, respectively, to the decompression circuits 650 and 652, as illustrated. Decompression circuits 650 and 652 are shown as circuit blocks in FIG. 5 and utilize standard JPEG decompression, as is known in the art. As shown, transfer buffer 530 is coupled to the decompression circuit 652, or alternatively, in those instances where still frames have been stored on the video disk 380, the raw video data may be coupled over a line 960 to bypass the decompression circuit 652, and be coupled directly to a multiplexor 962 as shown in FIG. 5.

Still video images may be stored by bypassing the compression circuit 360 and storing the still images directly onto the video disks 380. Upon retrieval, line 960 permits the bypass of the decompression circuit such that the still image may be coupled through the effects board 160 and ultimately viewed on the monitor 20 (see FIG. 1).

Continuing to refer to FIG. 5, output lines 964 and 966 are coupled from the decompression circuit 652 to blank insert circuits 970 and 972. In operation, video data passing from the DMA bus 370 through the decompression circuits 650 and 652 have no synchronization signal associated with the data, and are provided in a burst mode. The blank insert circuits 970 and 972 (as well as blank insert circuits 974 and 977) provide insert blanking intervals at the appropriate time to render the output signals in the format of digital video signals. As illustrated, the video output of the blank insert circuit 970 is coupled to a multiplexor 982. A luminance blanking level 984 provides 8-bit luminance data to the multiplexor 982, such that the output of the multiplexor 982 comprises digital video with appropriate blanking. Similarly, the output of blank insert circuit 972 is coupled to a multiplexor 986 having an input coupled directly to a blank insert circuit 972, as well as a chrominance blanking level 988 providing an appropriate chrominance signal. The blank insert circuit 974 is coupled to a multiplexor 992 and a luminance blanking level 994. The blank insert circuit 977 is coupled in a similar fashion to a multiplexor 999, and to a chrominance blanking level 1000. Line memory circuits 1001, 1004, 1006 and 1008 are coupled, respectively, to the multiplexors 982, 986, 992 and 999, as shown. The line memory circuits permit the present invention to selectively alter the timing known as "H-phase" for the respective video channels. A series of field interpolator circuits 1010, 1012, 1014 and 1016 are coupled to the respective line memories as illustrated in FIG. 5. The field interpolation circuits permit the system of the present invention to interpolate between the lines to create modified "new" lines, in the case of slow motion, or the display of still images. As a result of field interlacing in television systems, the display of still images or slow motion creates certain perceptible inconsistencies for objects in motion. In the industry, this effect is known as inter-field jitter. The field interpolation circuits combine the interlace field to create a stationery image (albeit blurred if the object is in motion), and thereby assist the editor in determining where to "effectuate" the edit on a frame by frame basis.

As illustrated, the output of the multiplexor 982 is coupled to a multiplexor 1020, as is the output of the field interpolator circuit 1010. Similarly, the output of the multiplexor 986 is coupled to a multiplexor 1022, along with the output of the field interpolator circuit 1012. A multiplexor 1024 is provided for receiving [he output of the multiplexor 992, as well as the field interpolator 1014, and a multiplexor 1026 is provided for receiving the output of the multiplexor 999 and field interpolator circuit 1016, as shown. Character generator circuits 1030 and 1032 are coupled to the multiplexors 1036 and 1042, to permit the system of the present invention to overlay text into the digital video signals. The ability to insert text into the video signal is useful for diagnostic and debugging purposes. Characters may include SMPTE time code as well as other text characters, as required. As is shown, the output of the character generator 1030 is coupled to a multiplexor 1036 which also receives the video output from the multiplexor 1020. The output of the character generator 1030 is also coupled to a multiplexor 1038, which also receives the video output of the multiplexor 1022.

As shown in FIG. 5, a multiplexor 1040 is coupled to receive the video output of the multiplexor 1024 as well as the E to E signal (see FIG. 4). As will be appreciated from the figures, the present invention's E to E signal path permits the viewing of incoming video data by bypassing the compression circuit 360 and decompression circuits 650 and 652. The output of the multiplexor 1040 is coupled to a multiplexor 1042, as is the output of the character generator 1032, thereby permitting the selection of either outputs. A multiplexor 1044 is coupled to receive the E to E signal which has been provided by 850 as well as the video output of the multiplexor 1026. As illustrated, the output of the multiplexor 1044 is coupled to a multiplexor 1046 as is the output of the character generator 1032.

Figure 9A:
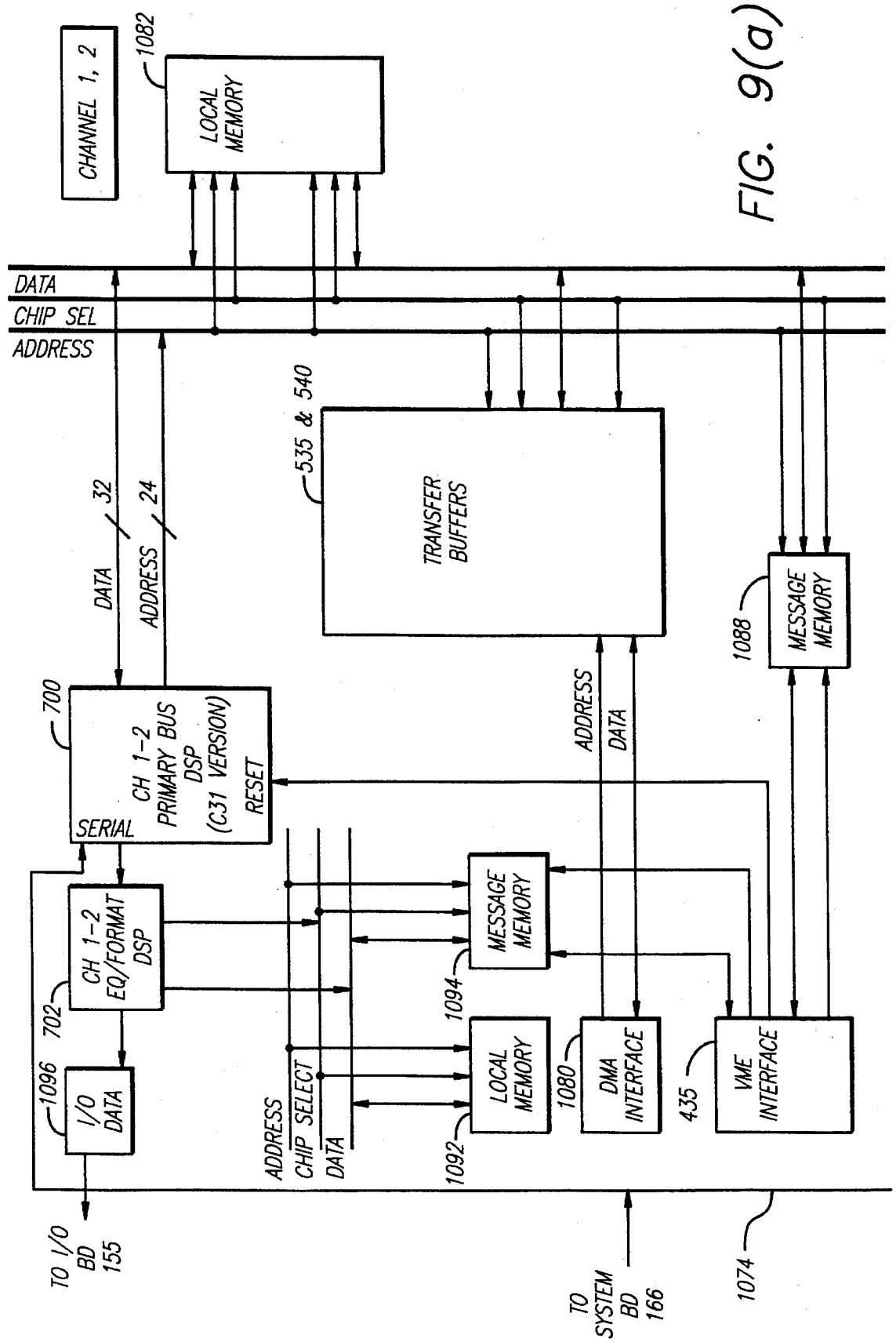

Referring now to FIGS. 9a and 9b, a more detailed discussion of the audio processing board 162 will be provided. Referring first to FIG. 9b, audio data received from the analog I/O board 155 is received by a I/O data buffer 1050, and is coupled to the digital signal processor chip 390. The audio data may then be coupled over a data path 1052 to the transfer buffer 392 and 394 over a bus 1054. Both address and data signals are provided over the address/data bus 1054. A DMA interface circuit 1056 receives signals from the DMA 400 (disposed on the system board 166) to control the transfer of data within the transfer buffers 392 and 394. Address and data signals are provided to the transfer buffers, which, as shown, are also coupled to the bus 1054. A local memory 1060 is coupled to the bus 1054, and a message memory 1062 is coupled to the bus 1054 and to the VME interface circuit 435 for synchronizing control data and other signals. In the presently preferred embodiment, the message memory 1062 comprises a dual port random access memory (RAM).

In a record mode, data is received from the I/O board 155 into the in/out data buffer 1050 and to the DSP 390. The DSP 390 transfers the data over the bus 1054 to the transfer buffers 392 and 394. Data is then coupled out to the system board through the DMA interface 1056 for storage on the audio disk 410. During playback, stored digital audio is received from the audio disk 410 over the DMA bus 402 and provided through the DMA interface 1056 to the transfer buffers 392 and 394. The audio data is then coupled over the bus 1054 to the DSP 390 and through the DSP 704 and into the in/out data buffer 1050 to the I/O board 1055. As previously described with reference to FIG. 3b and 3d, and as shown in more detail in FIG. 9b, DSP 704 is provided for audio effects which is coupled to a local memory 1070 and to a message memory 1072, as shown. Audio effects are then created to, or inserted in, the digital audio data stream provided to the I/O board 155. As previously described with reference to FIG. 3b, the circuits illustrated in FIGS. 9a and 9b are coupled to one another over line 1074. In addition, either the DSP 704 or DSP 390 may communicate directly with the DSP 700 over the line 1074 through switch 708.

Referring now to FIG. 9a, during playback audio data received from the system board 166 is coupled to a DMA interface 1080 and to the transfer buffers 535 and 540. Similarly, as in the case previously described with reference to FIG. 9b, the transfer buffers 535 and 540 are coupled to the bus 1054. A local memory 1082 is coupled to the bus 1054 for use by the DSP chips 700 and 702. A message memory 1088 is coupled to bus 1054 and to the VME interface circuit 435 for communication over the VME control bus 420. VME interface circuit 435 is illustrated in FIGS. 9a and 9b for a complete understanding of the invention. However, only a single VME interface circuit exists on the audio processing board 162. Additionally, the DSP 702, utilized for audio effects, is coupled to a local memory 1092 and to a local message memory 1094, as shown in operation, audio data received from the system board 166 is coupled through the DMA interface 1080 to the transfer buffers 535 and 540. DSP 700 couples the stored audio data from the transfer data buffers 535 and 540 through effects DSP 702 and out through an I/O data buffer 1096 to the I/O board 1055.

Figure 7:
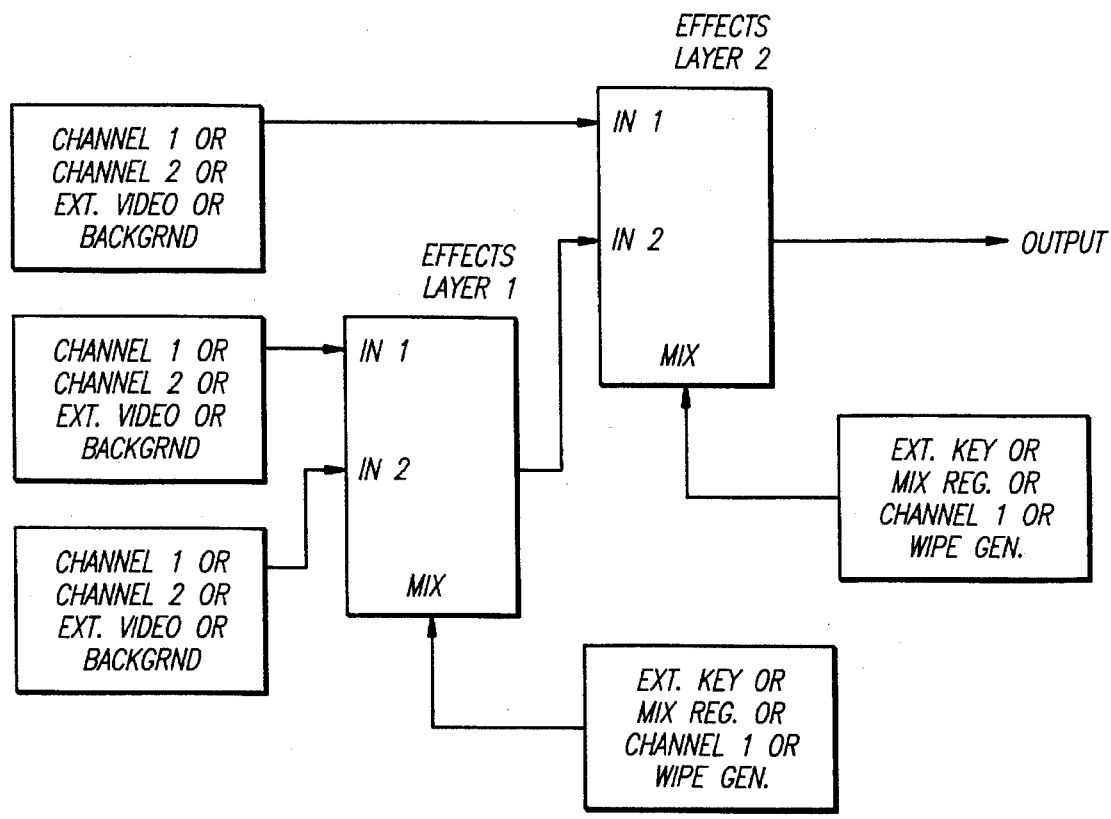
FIG. 7 is a block diagram illustrating in conceptual form the architecture of the effects circuitry of the present invention.
Figure 8:
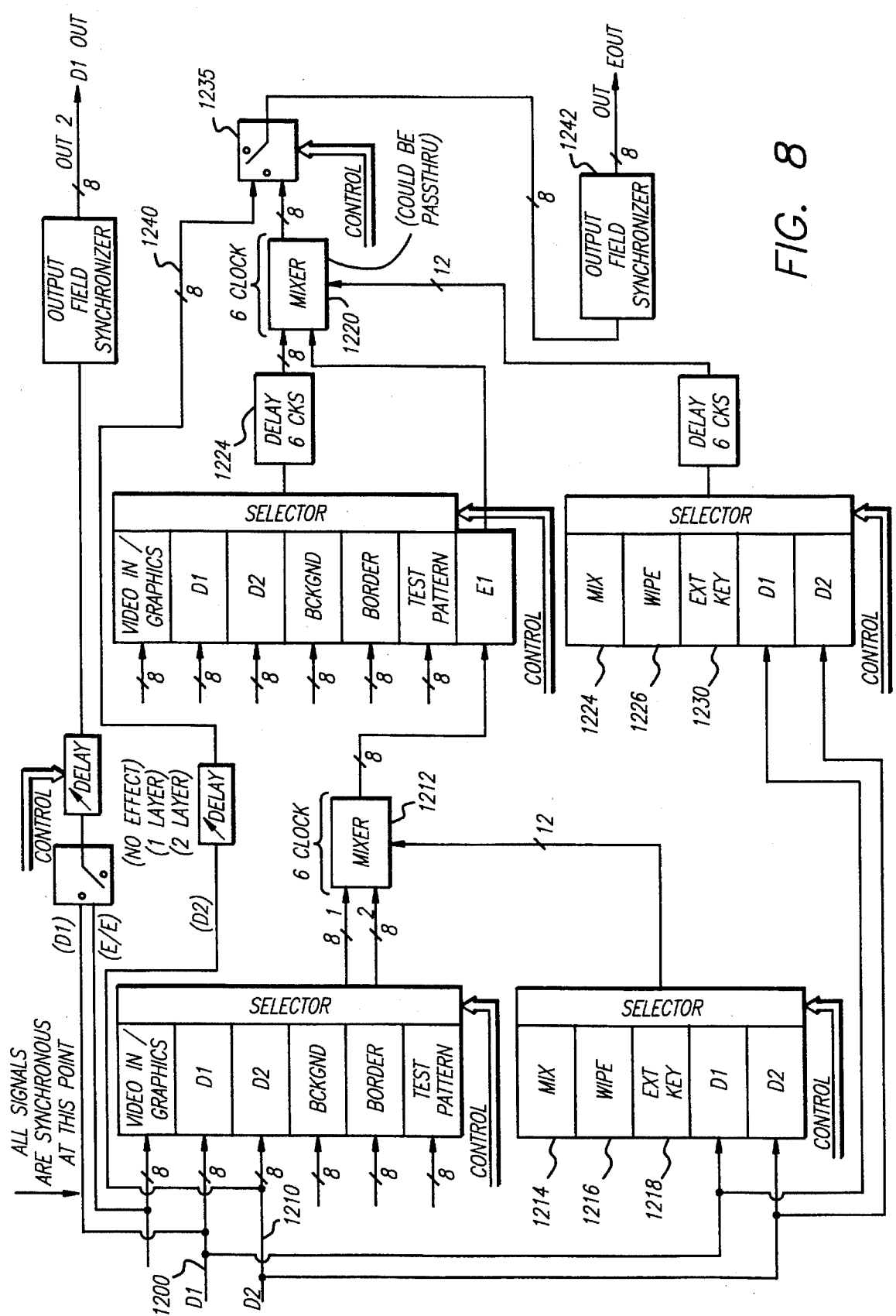
FIG. 8 is a more detailed block diagram illustrating the effects board comprising the present invention for the generation of special effects.

Referring now to FIGS. 7 and 8, the effects board 160 will be described in additional detail. The present invention provides multiple layers of effects, which permit picture-in-picture effects at the outputs. FIG. 7 provides a general overview of the multiple effects layers provided by the effects board 160 of the present invention. As illustrated, three video input channels are coupled to multiple layer effects circuits. For example, decompressed video originating from the decompression circuit 650, and decompressed video provided by the decompression circuit 652, may be coupled to the effects layer "1" shown in FIG. 7. Similarly, video provided from, for example, VTR 10 or VTR 12, may be coupled from the resync buffer 350 to effects layer "2". External key, mixes, wipes and other effects may be applied to the input video at both the effects layer "1" and effects layer "2". Additionally, the output of the effects layer "1" circuit is coupled as an input to the effects layer "2" circuit, as shown in FIG. 7, thereby permitting multiple levels of effects including picture-in-picture (PIP). The output of the effects layer "2" circuit represents the output video having the desired special effects. As previously described, a user may desire to bypass the effects provided by the effects board 160 by disabling the effects generator at both layers, and simply pass the video signal through as video output A and video output B (see FIG. 3a) to the effects device 16 (see FIG. 1) for the addition of desired special effects.

Referring to FIG. 8, a more detailed description of the effects board 160 will be provided. Decompressed video data from decompression circuit 652 is coupled to line 1200, decompressed video from decompression circuit 650 is coupled to line 1210. Six inputs are provided which include live video or graphics, two channels from the video disks 380, a background generator, a border generator and a test pattern, which are coupled, as shown, to a layer "1" mixer 1212. In the presently preferred embodiment, there are five possible paths for controlling the effects, namely, a mix generator 1214, a wipe generator 1216, an external key generator 1218, or either of the two video channels D-1 (from line 1200) or D-2 (from line 1210). As illustrated, the effects are coupled to the 1212. The output from the mixer 1 21 2 is coupled to a second layer mixer 1220. Similarly, one of six inputs may be provided to the second layer mixer 1220 as illustrated in FIG. 8. A delay block 1224 provides appropriate delays to the mixer 1220. As is in the case for the first layer, the second layer control includes mix 1224, wipe 1226, external key 1230, and the D-1 and D-2 channels from lines 1200 and 1210, respectively. As shown, a switch 1235 couples the output from the mixer 1220, or a bypass line 1240 to an output field synchronizer 1242.

Summary

While the present invention has been described with reference to FIGS. 1 through 11, it will be apparent to the skilled in the art that many alternatives, modifications and variations in light of the foregoing description are possible. Accordingly, the invention is intended to embrace all such alternatives, modifications and variations as may fall within the spirit and scope of the invention as disclosed.

We claim:

1. An apparatus for storing and retrieving video data comprising:
    video receiving means for receiving video signals and formatting said video signals into digital video data;
    video processing means coupled to said video receiving means for receiving said digital video data, said video processing means including:
    compression means for selectively compressing said video data;
    buffer means coupled to said compression means for temporarily storing said compressed video data, said buffer means comprising a first triple transfer buffer including a present buffer, a future buffer and a past buffer;
    decompression means coupled to said compression means and said buffer means for decompressing said video data stored in said buffer means said video data provided to a first output channel;
    memory control means coupled to said buffer means over a bus for storing and retrieving said video data on a storage device coupled to said memory control means over said bus;
    user control means coupled to said memory control means for providing instructions to said memory control means for storing and retrieving video data from said storage device.

2. The apparatus as defined by claim 1 further including a second triple transfer buffer coupled to said bus and to said decompression means for providing a second video output channel.

3. The apparatus as defined by claim 2 wherein said video data comprises a first source material which is compressed by said compression means and stored on said mass storage device.

4. The apparatus as defined by claim 3 wherein said first source material is read by said memory control means and stored in said first triple transfer buffer and in said second triple transfer buffer, such that said source material may be coupled to said first and second video output channels.

5. The apparatus as defined by claim 2 wherein selected video data stored in said mass storage device is stored in each of said triple transfer buffers such that said present transfer buffer stores video data currently coupled to one of said output channels, said past transfer buffer stores video data preceding video data stored in said present transfer buffer, and said future transfer buffer stores video data ahead of said video data stored in said present video transfer buffer.

6. The apparatus as defined by claim 5 wherein said video data stored in said mass storage device is selectively stored in each of said triple transfer buffers such that in operation, as a user plays through selected video data in said present buffer in a forward direction when the end of said present buffer is reached, said future buffer becomes a new present buffer, said past buffer becomes a new future buffer, and said present buffer becomes a new past buffer.

7. The apparatus as defined by claim 5 wherein said video data stored in said mass storage device is selectively stored in each of said triple transfer buffers such that in operation, as a user plays through selected video data in said present buffer in a reverse direction, when the end of said present buffer is reached, said past buffer becomes a new present buffer, said future buffer becomes a new past buffer and said present buffer becomes a new future buffer.

8. The apparatus as defined by claim 2 wherein said video processing means further includes by-pass means for selectively bypassing said compression means such that uncompressed video data is coupled from said video processing means to said first triple transfer buffer.

9. The apparatus as defined by claim 8 wherein said memory control means couples said uncompressed video over said bus for storage on said mass memory device.

10. The apparatus as defined by claim 9 wherein upon retrieval of said uncompressed video data, said by-pass means bypasses said decompression means and couples said uncompressed video to one of said output video channels.

11. The apparatus as defined by claim 10 wherein said first and second video channels may be adjusted such that still and motion video may be independently output on said first and second video channels.

12. The apparatus as defined by claim 2 further including loop back means coupled to at least one of said triple transfer buffers and to said memory control means for coupling a compressed first video frame from said mass storage device to said decompression means, said decompressed first video frame looped back and coupled to said compression circuit and recompressed, said recompressed first video frame stored on said mass storage device.

13. The apparatus as defined by claim 12 wherein said video frame is recompressed at 50% of the bandwidth of said storage device.

14. The apparatus as defined by claim 13 wherein said video frame is recompressed in a 2:1 compression.

15. The apparatus as defined by claim 14 wherein said video frame is recompressed at 50 Kilobytes per frame.

16. The apparatus as defined by claim 1 wherein as said compressed video data is stored is stored in said buffer means, said compressed video data is also decompressed by said decompression means and provided to a first video output channel.

17. The apparatus as defined by claim 16 wherein said first video output channel is coupled to a video display.

18. The apparatus as defined by claim 17 wherein said first video output channel is further coupled to a video tape recorder.

19. The apparatus as defined by claim 4 wherein said apparatus includes effects means coupled to said video processing means for selectively generating special video effects in said first and second video output channels.

20. The apparatus as defined by claim 19 wherein said received video signals comprise analog video signals.

21. The apparatus as defined by claim 20 wherein said video receiving means includes a analog to digital video conversion circuit means for receiving said analog video signals and converting said received analog video signals into said digital video data.

22. The apparatus as defined by claim 21 wherein said analog to digital video conversion circuit means further converts said digital video provided by said first and second video output channels into analog video signals.

23. The apparatus as defined by claim 22 wherein said storage device comprises a magnetic memory.

24. The apparatus as defined by claim 22 wherein said apparatus is coupled to at least one source video tape recorder for providing said received analog signals.

25. The apparatus as defined by claim 24 wherein at least one of said first and second video output channels are coupled to a record video tape recorder.

26. The apparatus as defined by claim 24 wherein at least one of said first and second video output channels are coupled to a video display.

27. The apparatus as defined by claim 24 wherein said apparatus is coupled to a Sony DFS-500 DME Switcher.

28. An apparatus for storing and retrieving audio data comprising:
    audio receiving means for receiving audio signals and formatting said audio signals into digital audio data;
    audio processing means coupled to said audio receiving means for receiving said digital audio data, said audio processing means including:
    digital signal processing (DSP) means coupled to receive said digital audio data;
    triple transfer buffer means coupled to said DSP means for temporarily storing said audio data, said triple transfer buffer means comprising a first triple transfer buffer including a present buffer, a future buffer and a past buffer;
    memory control means coupled to said buffer means over a bus for storing and retrieving said digital audio data on a storage device coupled to said memory control means over said bus;
    user control means coupled to said memory control means for providing instructions to said memory control means for storing and retrieving said digital audio data from said storage device.

29. The apparatus as defined by claim 28 wherein said triple transfer buffer means further comprises a second triple transfer buffer coupled to said bus and to said first triple transfer buffer.

30. The apparatus as defined by claim 29 wherein said digital audio data comprises a first source material which is stored on said storage device.

31. The apparatus as defined by claim 30 wherein said first source material is read by said memory control means and stored in said first triple transfer buffer and in said second Triple transfer buffer.

32. The apparatus as defined by claim 31 further including a third and a forth triple transfer buffer coupled to said bus, such that said first and second triple transfer buffer are coupled to a first DSP, and said third and forth triple transfer buffers are coupled to a second DSP.

33. The apparatus as defined by claim 32 wherein the output of said first DSP comprises a first and a second audio output channel and the output of said second DSP comprises a third and a forth audio channel.

34. The apparatus as defined by claim 33 wherein selected digital audio data stored in said mass storage device is stored in each of said triple transfer buffers such that said present transfer buffer stores digital audio data currently coupled to one of said output channels, said past transfer buffer stores digital audio data preceding audio data stored in said present transfer buffer, and said future transfer buffer stores audio data ahead of said digital audio data stored in said present audio transfer buffer.

35. The apparatus as defined by claim 34 wherein said digital audio data stored in said mass storage device is selectively stored in each of said triple transfer buffers such that in operation, as a user plays through selected digital audio data in said present buffer in a forward direction when the end of said present buffer is reached, said future buffer becomes a new present buffer, said past buffer becomes a new future buffer, and said present buffer becomes a new past buffer.

36. The apparatus as defined by claim 35 wherein said digital audio data stored in said mass storage device is selectively stored in each of said triple transfer buffers such that in operation, as a user plays through selected digital audio data in said present buffer in a reverse direction, when the end of said present buffer is reached, said past buffer becomes a new present buffer, said future buffer becomes a new past buffer and said present buffer becomes a new future buffer.

37. The apparatus as defined by claim 36 wherein at least one of said audio output channels is coupled to an audio mixer.

38. The apparatus as defined by claim 36 wherein said apparatus includes effects means coupled to said audio processing means for selectively generating special audio effects in at least one of said audio output channels.

39. The apparatus as defined by claim 38 wherein said received audio signals comprise analog audio signals.

40. The apparatus as defined by claim 39 wherein said audio receiving means includes a analog to digital audio conversion circuit means for receiving said analog audio signals and converting said received analog audio signals into said digital audio data.

41. The apparatus as defined by claim 40 wherein said analog to digital audio conversion circuit means further converts said digital audio provided by said audio output channels into analog audio signals.

42. The apparatus as defined by claim 41 wherein said storage device comprises a magnetic memory.

43. In an apparatus for storing and retrieving video data, a method for storing and retrieving said video data comprising the steps of:
  receiving video signals and formatting said video signals into digital video data;
   receiving said digital video data using video processing means, said video processing means:
   selectively compressing said video data using compression means;
  temporarily storing said compressed video data in buffer means coupled to said compression means, said buffer means comprising a first triple transfer buffer including a present buffer, a future buffer and a past buffer;
  decompressing said video data stored in said buffer means using decompression means coupled to said compression means and said buffer means, said video data provided to a first output channel;
  storing and retrieving said video data on a storage device using memory control means coupled to said buffer means over a bus;
  providing instructions to said memory control means using user control means coupled to said memory control means for storing and retrieving video data from said storage device.

44. The method as defined by claim 43 further including a second triple transfer buffer coupled to said bus and to said decompression means for providing a second video output channel.

45. The method as defined by claim 44 wherein said video data comprises a first source material which is compressed by said compression means and stored on said storage device.

46. The method as defined by claim 45 wherein said first source material is read by said memory control means and stored in said first triple transfer buffer and in said second triple transfer buffer, such that said source material may be coupled to said first and second video output channels.

47. The method as defined by claim 46 wherein selected video data stored in said mass storage device is stored in each of said triple transfer buffers such that said present transfer buffer stores video data currently coupled to one of said output channels, said past transfer buffer stores video data preceding video data stored in said present transfer buffer, and said future transfer buffer stores video data ahead of said video data stored in said present video transfer buffer.

48. The method as defined by claim 47 wherein said video data stored in said mass storage device is selectively stored in each of said triple transfer buffers such that in operation, as a user plays through selected video data in said present buffer in a forward direction when the end of said present buffer is reached, said future buffer becomes a new present buffer, said past buffer becomes a new future buffer, and said present buffer becomes a new past buffer.

49. The method as defined by claim 48 wherein said video data stored in said mass storage device is selectively stored in each of said triple transfer buffers such that in operation, as a user plays through selected video data in said present buffer in a reverse direction, when the end of said present buffer is reached, said past buffer becomes a new present buffer, said future buffer becomes a new past buffer and said present buffer becomes a new future buffer.

50. The method as defined by claim 45 further including the step of selectively bypassing said compression means such that uncompressed video data is coupled from said video processing means to said first triple transfer buffer.

51. The method as defined by claim 50 further including the step of coupling said uncompressed video over said bus for storage on said mass memory device.

52. The method as defined by claim 51 wherein upon retrieval of said uncompressed video data bypasses said decompression means and couples said uncompressed video to one of said output video channels.

53. The method as defined by claim 52 further including the step of adjusting said first and second video channels such that still and motion video may be independently output on said first and second video channels.

54. The method as defined by claim 46 further including the step of coupling a compressed first video frame from said mass storage device to said decompression means, and looping back said decompressed first video frame and coupling said decompressed first video frame to said compression circuit for recompression, said recompressed first video frame stored on said storage device.

55. The method as defined by claim 54 wherein said video frame is recompressed at 50% of the bandwidth of said storage device.

56. The method as defined by claim 54 wherein said video frame is recompressed in a 2:1 compression.

57. The method as defined by claim 54 wherein said video frame is recompressed at 50 kilobytes per frame.

58. The method as defined by claim 43 wherein as said compressed video data is stored is stored in said buffer means, said compressed video data is also decompressed by said decompression means and provided to a first video output channel.

59. The method as defined by claim 58 wherein said first video output channel is coupled to a video display.

60. The method as defined by claim 59 wherein said first video output channel is further coupled to a video tape recorder.

61. The method as defined by claim 47 further including the step of selectively generating special video effects in said first and second video output channels.

62. The method as defined by claim 51 wherein said received video signals comprise analog video signals.

63. The method as defined by claim 62 wherein said video receiving means includes a analog to digital video conversion circuit means for receiving said analog video signals and converting said received analog video signals into said digital video data.

64. The method as defined by claim 63 wherein said analog to digital video conversion circuit means further converts said digital video provided by said first and second video output channels into analog video signals.

65. The method as defined by claim 64 wherein said storage device comprises a magnetic memory.

66. The method as defined by claim 65 wherein said apparatus is coupled to at least one source video tape recorder for providing said received analog signals.

67. The method as defined by claim 66 wherein at least one of said first and second video output channels are coupled to a record video tape recorder.

68. The method as defined by claim 67 wherein at least one of said first and second video output channels are coupled to a video display.

69. In an apparatus for storing and retrieving audio data, a method for storing and retrieving said audio data compressing the steps of:

receiving audio signals using audio receiving means and formatting said audio signals into digital audio data;

receiving said digital audio data using audio processing means coupled to said audio receiving means, wherein said audio processing means:

receives said digital audio data using digital signal processing (DSP) means;

temporarily stores said audio data using triple transfer buffer means coupled to said DSP means, said triple transfer buffer means comprising a first triple transfer buffer including a present buffer, a future buffer and a past buffer;

stores and retrieves said digital audio data on a storage device coupled to said memory control means over said bus using memory control means coupled to said buffer means;

provides instructions to said memory control means for storing and retrieving said digital audio data from said storage device using user control means coupled to said memory control means.

70. The method as defined by claim 69, wherein said triple transfer buffer means further comprises a second triple transfer buffer coupled to said bus and to said first triple transfer buffer.

71. The method as defined by claim 70 wherein said digital audio data comprises a first source material which is stored on said storage device.

72. The method as defined by claim 71 wherein said first source material is read by said memory control means and stored in said first triple transfer buffer and in said second triple transfer buffer.

73. The method as defined by claim 72 further including a third and a forth triple transfer buffer coupled to said bus, such that said first and second triple transfer buffer are coupled to a first DSP, and said third and forth triple transfer buffers are coupled to a second DSP.

74. The method as defined by claim 73 wherein the output of said first DSP comprises a first and a second audio output channel and the output of said second DSP comprises a third and a forth audio channel.

75. The method as defined by claim 74 wherein selected digital audio data stored in said mass storage device is stored in each of said triple transfer buffers such that said present transfer buffer stores digital audio data currently coupled to one of said audio output channels, said past transfer buffer stores digital audio data preceding audio data stored in said present transfer buffer, and said future transfer buffer stores audio data ahead of said digital audio data stored in said present audio transfer buffer.

76. The method as defined by claim 75 wherein said digital audio data stored in said mass storage device is selectively stored in each of said triple transfer buffers such that in operation, as a user plays through selected digital audio data in said present buffer in a forward direction when the end of said present buffer is reached, said future buffer becomes a new present buffer, said past buffer becomes a new future buffer, and said present buffer becomes a new past buffer.

77. The method as defined by claim 76 wherein said digital audio data stored in said mass storage device is selectively stored in each of said triple transfer buffers such that in operation, as a user plays through selected digital audio data in said present buffer in a reverse direction, when the end of said present buffer is reached, said past buffer becomes a new present buffer, said future buffer becomes a new past buffer and said present buffer becomes a new future buffer.

78. The method as defined by claim 77 wherein at least one of said audio output channels is coupled to an audio mixer.

79. The method as defined by claim 78 further including the step of generating special audio effects in at least one of said audio output channels.

80. The method as defined by claim 79 wherein said received audio signals comprise analog audio signals.

81. The method as defined by claim 80 wherein said audio receiving means includes a analog to digital audio conversion circuit means for receiving said analog audio signals and converting said received analog audio signals into said digital audio data.

82. The method as defined by claim 81 further including the step of converting said digital audio provided by said audio output channels into analog audio signals;

83. The method as defined by claim 82 wherein said mass storage device comprises a magnetic memory.

84. An apparatus for storing and retrieving audio and video data comprising:

video receiving means for receiving video signal and formatting said video signals into digital video data;

audio receiving means for receiving audio signals and formatting said audio signals into digital audio signals;

video processing means coupled to said video receiving means for receiving said digital video data, said video processing means including:

compression means for selectively compressing said video data;

first buffer means coupled to said compression means for temporarily storing said compressed video data, said first buffer means comprising a first triple transfer buffer including a present buffer, a future buffer and a past buffer;

decompression means coupled to said compression means and said first buffer means for decompressing said video data stored in said first buffer means said video data provided to a first output channel;

first memory controls means coupled to said buffer means over a first bus for storing and retrieving said video data on a storage device coupled to said first memory control means over said first bus;

first user control means coupled to said memory control means for providing instructions to said first memory control means for storing and retrieving video data from said storage device;

audio processing means coupled to said audio receiving means for receiving said digital auto data, said audio processing, means including:

digital signal processing (DSP) means coupled to receive said digital audio data;

second buffer means coupled to said DSP means for temporarily storing said audio data, said second buffer means comprising a second triple transfer buffer including a present buffer, a future buffer and a past buffer;

second memory control means coupled to said second buffer means over a second bus for storing and retrieving said digital audio data on said mass storage device coupled to said second memory control means over said second bus;

second user control means coupled to said second memory control means for providing instructions to said second memory control means for storing and retrieving said digital audio data from said storage device.

\* \* \* \* \*